US010118689B2

(12) United States Patent
Bandera et al.

(10) Patent No.: US 10,118,689 B2
(45) Date of Patent: Nov. 6, 2018

(54) HYDROSTATIC AUTOMATIC FLIGHT SERVO SYSTEMS

(71) Applicant: HONEYWELL INTERNATIONAL INC., Morristown, NJ (US)

(72) Inventors: Pablo Bandera, Avondale, AZ (US); Jon Bartling, Phoenix, AZ (US); Dean Wilkens, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 558 days.

(21) Appl. No.: 14/823,128

(22) Filed: Aug. 11, 2015

(65) Prior Publication Data

US 2017/0043861 A1 Feb. 16, 2017

(51) Int. Cl.
*B64C 13/36* (2006.01)
*B64C 13/16* (2006.01)

(52) U.S. Cl.
CPC .............. *B64C 13/36* (2013.01); *B64C 13/16* (2013.01)

(58) Field of Classification Search
CPC ......... B64C 13/36; B64C 13/02; B64C 13/04; F15B 7/001; F15B 7/008
USPC .................................................. 60/583, 581
See application file for complete search history.

(56) References Cited

U.S. PATENT DOCUMENTS

| | | | |
|---|---|---|---|
| 4,345,195 | A | 8/1982 | Griffith et al. |
| 5,431,015 | A | 7/1995 | Hein et al. |
| 6,572,055 | B1 | 6/2003 | Bernard |
| 7,640,743 | B2 | 1/2010 | Hanlon et al. |
| 8,262,479 | B2 | 9/2012 | Bandera et al. |

*Primary Examiner* — Thomas E Lazo
*Assistant Examiner* — Daniel Collins
(74) *Attorney, Agent, or Firm* — Lorenz & Kopf, LLP

(57) ABSTRACT

A hydrostatic automatic flight servo system is provided. The automatic flight servo system includes a manifold that defines a first fluid chamber, and a hydraulic fluid is received in the first fluid chamber. The first fluid chamber includes a first bellows and a second bellows. The automatic flight servo system includes a stick received at least partially within the manifold and pivotally coupled to the manifold. The stick includes a control arm fixedly coupled to the first bellows, and the stick is to receive an input. The automatic flight servo system includes a flight output system pivotally coupled to the manifold. The flight output system includes a second control arm received at least partially within the manifold and coupled to the second bellows such that the pivotal movement of the stick pivots the flight output system relative to the manifold.

14 Claims, 10 Drawing Sheets

SAS
Act. 2
SAS
Act. 1
Trim
Actuator

HYDROSTATIC AUTOMATIC FLIGHT SERVO SYSTEMS

TECHNICAL FIELD

The present disclosure generally relates to automatic flight servo systems, and more particularly relates to a compact hydrostatic automatic flight servo system for use with an aircraft.

BACKGROUND

Certain mobile platforms, such as aircraft, employ automatic flight servo systems to assist the pilot in piloting of the aircraft and to augment flight stability during pilot operation. Automatic flight servo systems may also maintain stable flight during non-piloted operation of the aircraft. Generally, these automatic flight servo systems comprise numerous actuators and mechanical couplings in order to meet federal requirements and to perform the requested operations. These actuators and mechanical couplings are connected via linkages and distributed throughout the structure of the aircraft. Due to the numerous actuators, mechanical couplings and linkages, automatic flight servo systems are quite large and heavy, and thus, in certain instances are unsuitable for smaller aircraft. Moreover, distributing components throughout the aircraft often requires additional analysis and effort to maintain structural stability.

Accordingly, it is desirable to provide an improved automatic flight servo system, which is lighter and compact for use on smaller aircraft. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a hydrostatic automatic flight servo system. The automatic flight servo system includes a manifold that defines a first fluid chamber, and a hydraulic fluid is received in the first fluid chamber. The first fluid chamber includes a first bellows and a second bellows. The automatic flight servo system includes a stick received at least partially within the manifold and pivotally coupled to the manifold. The stick includes a control arm fixedly coupled to the first bellows, and the stick is to receive an input. The automatic flight servo system includes a flight output system pivotally coupled to the manifold. The flight output system includes a second control arm received at least partially within the manifold and coupled to the second bellows such that the pivotal movement of the stick pivots the flight output system relative to the manifold.

Further provided according to various embodiments is a hydrostatic automatic flight servo system. The automatic flight servo system includes a manifold that defines a first fluid chamber and a second fluid chamber, and a hydraulic fluid is received in each of the first fluid chamber and the second fluid chamber. The first fluid chamber is fluidly isolated from the second fluid chamber. The first fluid chamber includes a first bellows and a second bellows, and the second fluid chamber includes a third bellows and a fourth bellows. The automatic flight servo system includes a stick received at least partially within the manifold and pivotally coupled to the manifold. The stick includes a first control arm fixedly coupled to the first bellows and a second control arm fixedly coupled to the third bellows, and the first control arm is spaced apart from the second control arm. The automatic flight servo system also includes an output linkage pivotally coupled to the manifold. The output linkage includes a third control arm spaced apart from a fourth control arm, and each of the third control arm and the fourth control arm are received at least partially within the manifold. The third control arm is fixedly coupled to the second bellows and the fourth control arm is fixedly coupled to the fourth bellows such that the pivotal movement of the stick pivots the output linkage relative to the manifold.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. Moreover, while the automatic flight servo system is described herein as being used onboard an aircraft, such as an airplane, rotorcraft or spacecraft, it will be understood that the various teachings of the present disclosure may be employed with any suitable mobile platform, such as a bus, motorcycle, train, motor vehicle, marine vessel and the like. In addition, the various teachings of the present disclosure can be employed with a stationary platform in which it is desired to transfer direct linear input into a direct linear output without the use of complex mechanical linkages. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
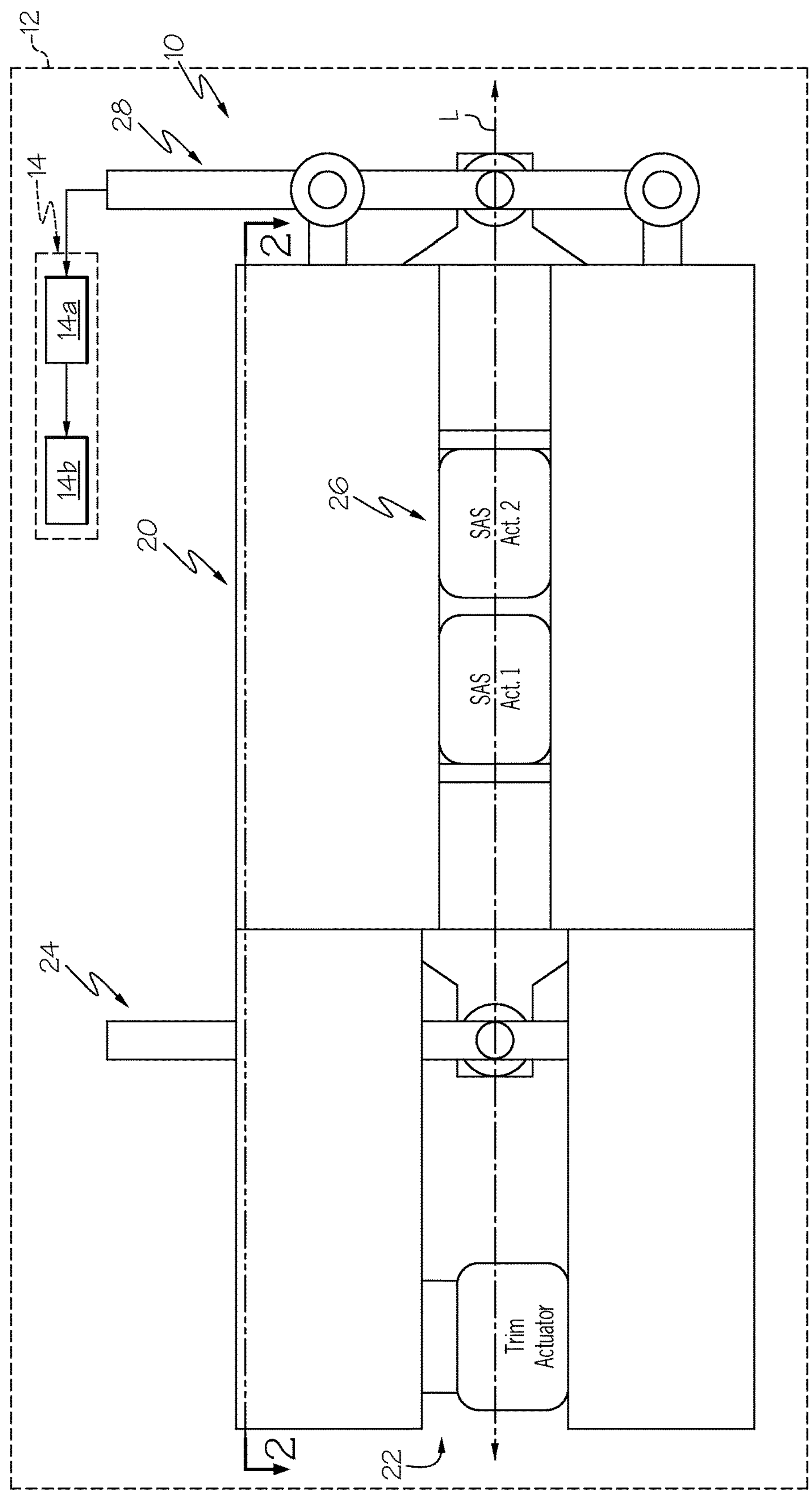
FIG. 1 is a schematic perspective illustration of a compact hydraulic automatic flight servo system in accordance with various embodiments.

With reference to FIG. 1, a hydrostatic automatic flight servo system 10 is shown. The automatic flight servo system 10 can be employed with an aircraft 12 to substantially automatically control the operation or movement of one or more flight surfaces 14 associated with the aircraft 12. For example, in the example of the aircraft 12 as a rotorcraft, the one or more flight surfaces 14 comprise a rotor blade 14*b* coupled to a swashplate 14*a*. In the following example, the automatic flight servo system 10 provides output to the swashplate 14*a* for controlling the operation or movement of a rotor blade 14*b*. It should be understood, however, that the automatic flight servo system 10 may control any suitable flight surface associated with the aircraft 12. The automatic flight servo system 10 includes a manifold 20, a trim input system 22, a pilot input system 24, a stability augmentation system 26 and a flight output system 28.

Figure 2:
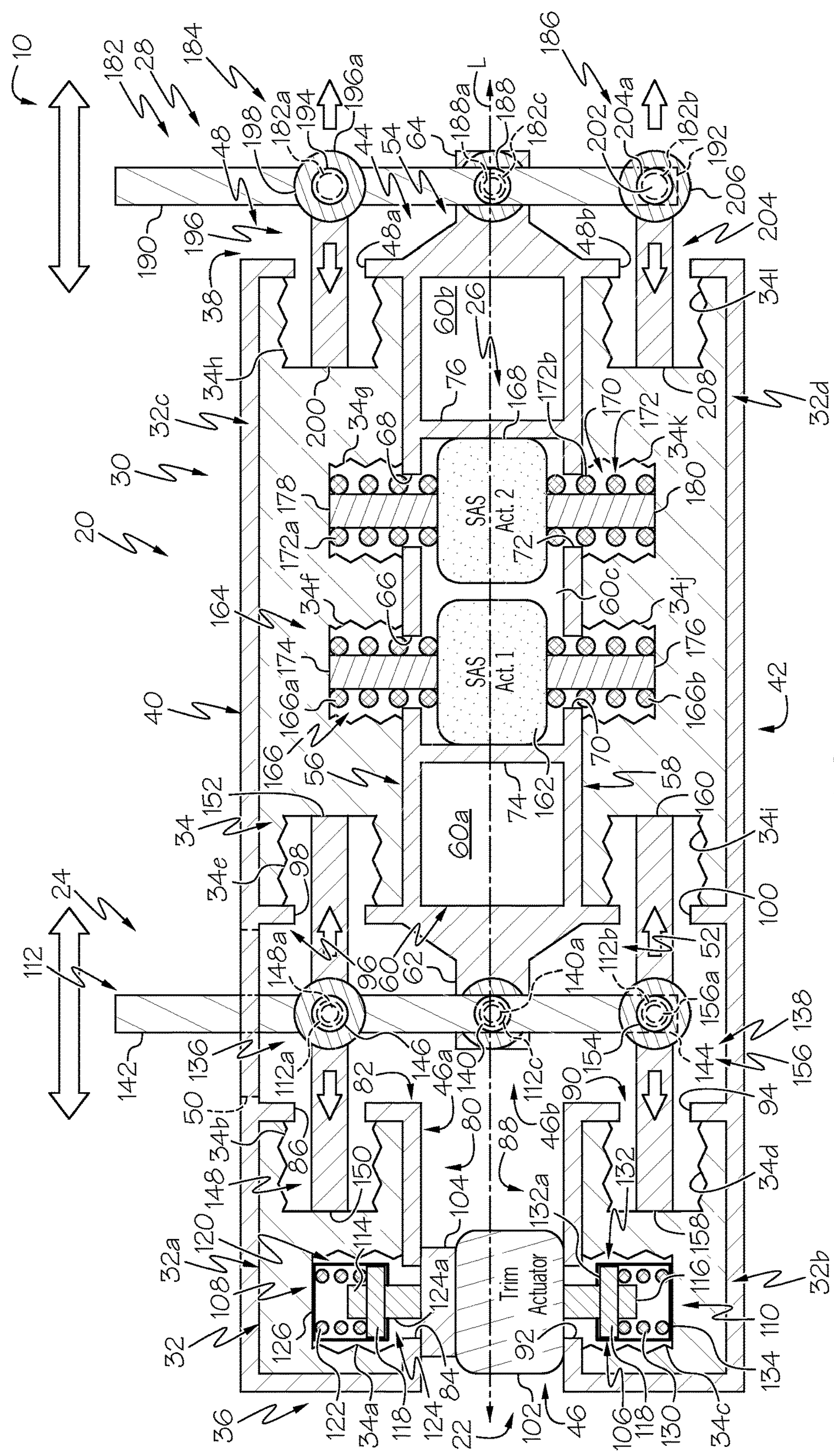
FIG. 2 is a schematic cross-sectional illustration of the compact hydrostatic automatic flight servo system of FIG. 1, taken along line 2-2 of FIG. 1, illustrating the compact hydrostatic automatic flight servo system in a first position in accordance with various embodiments.

With reference to FIG. 2, the manifold 20 comprises a housing 30 that defines one or more fluid chambers 32 and includes one or more movable members or bellows 34. As will be discussed, the one or more fluid chambers 32 and the one or more bellows 34 are configured to cooperate with the trim input system 22, the pilot input system 24, the stability augmentation system 26 and the flight output system 28. The housing 30 comprises any desired shape to substantially enclose the one or more fluid chambers 32 and the one or more bellows 34. In one example, the housing 30 is substantially rectangular and extends along a longitudinal axis L, however, it will be understood that the housing 30 can have any desired shape. The housing 30 is comprised of any suitable material, and in one example, the housing 30 comprises a metal or a metal alloy. It should be noted that the housing 30 can comprise a suitable fiber reinforced polymeric material if desired. The housing 30 defines a first side 36, a second side 38, a third side 40, a fourth side 42 and includes an intermediate support portion 44.

The first side 36 is generally opposite the second side 38. The first side 36 extends generally transverse to the longitudinal axis L, and defines a recessed portion 46 for receipt of a portion of the trim input system 22 and a portion of the pilot input system 24. In one example, the recessed portion 46 is defined through the first side 36 so as to extend along the longitudinal axis L and to be substantially symmetric with respect to the longitudinal axis L, however, the recessed portion 46 can be positioned at any desired location. The recessed portion 46 is generally defined through the first side 36 and extends to the intermediate support portion 44. The recessed portion 46 includes a first branch 46*a* and a second branch 46*b*. The first branch 46*a* is configured to receive a portion of the trim input system 22, and the second branch 46*b* is configured to receive a portion of the pilot input system 24. In one example, the second branch 46*b* has a greater area than the first branch 46*a*.

The second side 38 extends generally transverse to the longitudinal axis L. The second side 38 defines one or more openings 48. In one example, the second side 38 defines a first opening 48*a* and a second opening 48*b*. Generally, the first opening 48*a* is spaced apart from the second opening 48*b* along the second side 38. In one example, the first opening 48*a* is substantially symmetric to the second opening 48*b* about the longitudinal axis L. The first opening 48*a* and the second opening 48*b* are sized to enable a portion of the flight output system 28 to be received within and move relative to the first opening 48*a* and the second opening 48*b*, as will be discussed in greater detail herein.

The third side 40 is defined between the first side 36 and the second side 38, and is substantially opposite the fourth side 42. The third side 40 defines a channel or slot 50. The slot 50 is sized and configured to enable a portion of the pilot input system 24 to pass therethrough and to enable a portion of the pilot input system 24 to be movable relative to the manifold 20. In one example, the slot 50 has a length, which is about equal to a length of the second branch 46*b*. The fourth side 42 is defined between the first side 36 and the second side 38, and is substantially planar.

The intermediate support portion 44 is defined between the third side 40 and the fourth side 42, and extends from the second side 38 towards the first side 36, such that the intermediate support portion 44 terminates at the second branch 46*b*. The intermediate support portion 44 is generally formed along the second side 38 so as to extend between the first opening 48*a* and the second opening 48*b*. In one example, the intermediate support portion 44 includes a first intermediate side 52, a second intermediate side 54, a third intermediate side 56, a fourth intermediate side 58 and one or more cavities 60. The intermediate support portion 44 serves to at least partially support the pilot input system 24 and the flight output system 28.

The first intermediate side 52 is generally opposite the second intermediate side 54. The first intermediate side 52 includes a first support arm 62. The first support arm 62 extends outwardly from the first intermediate side 52 along the longitudinal axis L of the housing 30. The first support arm 62 is coupled to a portion of the pilot input system 24. In one example, the first support arm 62 is coupled to the portion of the pilot input system 24 such the pilot input system 24 is movable or pivotable relative to the first intermediate side 52, as will be discussed in greater detail herein.

The second intermediate side 54 includes a second support arm 64. The second support arm 64 extends outwardly from the second intermediate side 54 along the longitudinal axis L of the housing 30. The second support arm 64 is coupled to a portion of the flight output system 28. In one example, the second support arm 64 is coupled to the portion of the flight output system 28 such the flight output system 28 is movable or pivotable relative to the second intermediate side 54, as will be discussed in greater detail herein.

The third intermediate side 56 extends between the first intermediate side 52 and the second intermediate side 54. In one example, the third intermediate side 56 is substantially planar, and defines a first channel or first bore 66 and a second channel or second bore 68. The first bore 66 and the second bore 68 are defined through the third intermediate side 56 to enable a respective portion of the stability augmentation system 26 to extend through the third intermediate side 56. In one example, the first bore 66 and the second bore 68 are defined through the third intermediate side 56 so as to be spaced apart by a predefined distance. It should be understood, however, that the third intermediate side 56 can comprise a single bore through which a portion of the stability augmentation system 26 is movable. Generally, the first bore 66 and the second bore 68 are sized such that a portion of the stability augmentation system 26 is movable relative to the first bore 66 and the second bore 68, and thus, the third intermediate side 56.

The fourth intermediate side 58 extends between the first intermediate side 52 and the second intermediate side 54. In one example, the fourth intermediate side 58 is substantially planar, and defines a third channel or third bore 70 and a fourth channel or fourth bore 72. The third bore 70 and the fourth bore 72 are defined through the fourth intermediate side 58 to enable a respective portion of the stability augmentation system 26 to extend through the fourth intermediate side 58. In one example, the third bore 70 and the fourth bore 72 are defined through the fourth intermediate side 58 so as to be spaced apart by a predefined distance. Generally, the third bore 70 and the fourth bore 72 are defined through the fourth intermediate side 58 such that the third bore 70 and the fourth bore 72 are substantially coaxial with the first bore 66 and the second bore 68 of the third intermediate side 56. It should be understood, however, that the fourth intermediate side 58 can comprise a single bore through which a portion of the stability augmentation system 26 is movable. Generally, the third bore 70 and the fourth bore 72 are sized such that a portion of the stability augmentation system 26 is movable relative to the third bore 70 and the fourth bore 72, and thus, the fourth intermediate side 58.

The one or more cavities 60 are defined between the third intermediate side 56 and the fourth intermediate side 58. In one example, the one or more cavities 60 comprise a first cavity 60*a*, a second cavity 60*b* and a third cavity 60*c*. Generally, the first cavity 60*a* is defined by the first intermediate side 52, the third intermediate side 56, the fourth intermediate side 58 and a crossbar 74. The first cavity 60*a* is substantially rectangular, however, the first cavity 60*a* can have any desired shape and size. The first cavity 60*a* is generally empty, and serves to provide structural rigidity to the intermediate support portion 44 via the crossbar 74. The second cavity 60*b* is defined by the second intermediate side 54, the third intermediate side 56, the fourth intermediate side 58 and a second crossbar 76. The second cavity 60*b* is substantially rectangular, however, the second cavity 60*b* can have any desired shape and size. The second cavity 60*b* is generally empty, and serves to provide structural rigidity to the intermediate support portion 44 via the second crossbar 76. The third cavity 60*c* is defined by the crossbar 74, the second crossbar 76, the third intermediate side 56 and the fourth intermediate side 58. The third cavity 60*c* is substantially rectangular and generally has a larger volume than the first cavity 60*a* and the second cavity 60*b* ; however, the third cavity 60*c* can have any desired shape and size. The third cavity 60*c* generally receives a portion of the stability augmentation system 26.

With continued reference to FIG. 2, the housing 30 defines the one or more fluid chambers 32. In one example, the one or more fluid chambers 32 comprise a first fluid chamber 32*a*, a second fluid chamber 32*b*, a third fluid chamber 32*c* and a fourth fluid chamber 32*d*. It will be understood, however, that the number and arrangement of the one or more fluid chambers 32 is merely exemplary, and the manifold 20 may include any number and arrangement of fluid chambers 32. In this example, the first fluid chamber 32*a* is defined generally opposite the second fluid chamber 32*b* about the longitudinal axis L, and the third fluid chamber 32*c* is defined generally opposite the fourth fluid chamber 32*d* about the longitudinal axis L. Each of the first fluid chamber 32*a*, the second fluid chamber 32*b*, the third fluid chamber 32*c* and the fourth fluid chamber 32*d* are fluidly or hydraulically isolated from each other. In addition, each of the first fluid chamber 32*a*, the second fluid chamber 32*b*, the third fluid chamber 32*c* and the fourth fluid chamber 32*d* contain a hydraulic fluid. As is generally known in the art, a "hydrostatic fluid" is a fluid that is incompressible and static. The first fluid chamber 32*a*, the second fluid chamber 32*b*, the third fluid chamber 32*c* and the fourth fluid chamber 32*d* comprise any suitable hydraulic fluid, for example, a suitable aeronautical hydraulic fluid as known to one of ordinary skill in the art.

The first fluid chamber 32*a* is defined along the first side 36 and the third side 40 of the housing 30, and is further defined by a first wall 80 associated with the first branch 46*a* and a second wall 82 associated with the second branch 46*b* of the recessed portion 46 of the housing 30. The first wall 80 defines an opening or bore 84, and the second wall 82 defines a second opening or second bore 86. The bore 84 is sized and configured to receive a portion of the trim input system 22, and the second bore 86 is sized and configured to receive a portion of the pilot input system 24. Generally, the trim input system 22 is movable relative to the bore 84, and the pilot input system 24 is movable relative to the second bore 86 as will be discussed in greater detail herein.

The second fluid chamber 32*b* is defined along the first side 36 and the fourth side 42 of the housing 30, and is further defined by a third wall 88 associated with the first branch 46*a* and a fourth wall 90 associated with the second branch 46*b* of the recessed portion 46 of the housing 30. The third wall 88 defines an opening or third bore 92, and the fourth wall 90 defines a second opening or fourth bore 94. The third bore 92 is sized and configured to receive a portion of the trim input system 22, and the fourth bore 94 is sized and configured to receive a portion of the pilot input system 24. The trim input system 22 is movable relative to the third bore 92, and the pilot input system 24 is movable relative to the fourth bore 94 as will be discussed in greater detail herein. Generally, an axis of the third bore 92 is coaxially aligned with an axis of the bore 84 to facilitate the movement of the trim input system 22 relative to the second bore 86 and the third bore 92.

The third fluid chamber 32*c* is defined along the third side 40 of the housing 30 and the third intermediate side 56 of the intermediate support portion 44, and is further defined by a fifth wall 96 associated with the second branch 46*b* of the recessed portion 46 of the housing 30 and the second side 38 of the housing 30. The fifth wall 96 defines an opening or fifth bore 98 and an opening or sixth bore 100. The fifth bore 98 is in fluid communication with the third fluid chamber 32*c*, while the sixth bore 100 is in fluid communication with the fourth fluid chamber 32*d*. Thus, the fifth bore 98 is spaced apart from the sixth bore 100 along the fifth wall 96. The fifth bore 98 and the sixth bore 100 each receive a portion of the pilot input system 24, as will be discussed further below. The first opening 48*a* of the second side 38 of the housing 30 is in fluid communication with the third fluid chamber 32*c*.

The fourth fluid chamber 32*d* is defined along the fourth side 42 of the housing 30 and the fourth intermediate side 58 of the intermediate support portion 44, and is further defined by the fifth wall 96 associated with the second branch 46*b* of the recessed portion 46 of the housing 30 and the second side 38 of the housing 30. The sixth bore 100 is in fluid communication with the fourth fluid chamber 32*d*, and the second opening 48*b* of the second side 38 of the housing 30 is in fluid communication with the fourth fluid chamber 32*d*.

The one or more bellows 34 cooperate with the various bores and openings associated with the housing 30. In one example, the housing 30 includes twelve bellows: a first bellows 34*a*, a second bellows 34*b*, a third bellows 34*c*, a fourth bellows 34*d*, a fifth bellows 34*e*, a sixth bellows 34*f*, a seventh bellows 34*g*, an eighth bellows 34*h*, a ninth bellows 34*i*, a tenth bellows 34*j*, an eleventh bellows 34*k* and a twelfth bellows 34*l*. Each of the bellows 34*a*-34*l* comprise metallic bellows; however, the bellows 34*a*-34*l* may be composed of any suitable material. Generally, the bellows 34*a*-34*l* are composed of a material with sufficient rigidity to sustain the fluid pressure levels associated with the fluid within the respective one of the fluid chambers 32*a*-32*d*, but with sufficient flexibility to enable the movement of the bellows 34*a*-34*l* for a predefined stroke upon receipt of input from the trim input system 22, the pilot input system 24, the stability augmentation system 26, and the flight output system 28. Each of the bellows 34*a*-34*l* are coupled to a respective one of the bores or openings through any suitable technique, such as welding, mechanical fasteners with seals, etc., and moreover, one or more of the bellows 34*a*-34*l* may be defined in the manifold 20 via stamping, such that the bellows 34*a*-34*l* may be integrally formed with the manifold 20, if desired.

Each of the bellows 34*a*-34*l* are coupled to the respective one of the openings and/or bores such that the respective bellows 34*a*-34*l* forms a leak-proof seal about the respective one of the openings and/or bores. Generally, each of the bellows 34*a*-34*l* are coupled to the respective one of the openings or bores so as to be movable within the respective fluid chamber 32 associated with the respective one of the openings or bores. In one example, the first bellows 34*a* is coupled about the bore 84 to prevent the ingress and egress of fluid from the first fluid chamber 32*a*, and so as to be movable relative to the bore 84 by the fluid contained in the first fluid chamber 32*a*. The second bellows 34*b* is coupled about the second bore 86 also to prevent the ingress and egress of fluid from the first fluid chamber 32*a* and so as to be movable relative to the second bore 86 by the fluid contained in the first fluid chamber 32*a*. The third bellows 34*c* is coupled about the third bore 92 to prevent the ingress and egress of fluid from the second fluid chamber 32*b* and so as to be movable relative to the third bore 92 by the fluid contained in the second fluid chamber 32*b*. The fourth bellows 34*d* is coupled about the fourth bore 94 to prevent the ingress and egress of fluid from the second fluid chamber 32*b* and so as to be movable relative to the fourth bore 94 by the fluid contained in the second fluid chamber 32*b*. The fifth bellows 34*e* is coupled about the fifth bore 98 to prevent the ingress and egress of fluid from the third fluid chamber 32*c* and so as to be movable relative to the fifth bore 98 by the fluid contained in the third fluid chamber 32*c*. The sixth bellows 34*f* is coupled about the first bore 66 to prevent the ingress and egress of fluid from the third fluid chamber 32*c*, and so as to be movable relative to the first bore 66 by the fluid contained in the third fluid chamber 32*c*. The seventh bellows 34*g* is coupled about the second bore 68 to prevent the ingress and egress of fluid from the third fluid chamber 32*c*, and so as to be movable relative to the second bore 68 by the fluid contained in the third fluid chamber 32*c*. The eighth bellows 34*h* is coupled about the first opening 48*a* to also prevent the ingress and egress of fluid from the third fluid chamber 32*c*, and so as to be movable relative to the first opening 48*a* by the fluid contained in the third fluid chamber 32*c*. The ninth bellows 34*i* is coupled about the sixth bore 100 to prevent the ingress and egress of fluid from the fourth fluid chamber 32*d*, and so as to be movable relative to the sixth bore 100 by the fluid contained in the fourth fluid chamber 32*d*. The tenth bellows 34*j* is coupled about the third bore 70 to prevent the ingress and egress of fluid from the fourth fluid chamber 32*d*, and so as to be movable relative to the third bore 70 by the fluid contained in the fourth fluid chamber 32*d*. The eleventh bellows 34*k* is coupled about the fourth bore 72 to prevent the ingress and egress of fluid from the fourth fluid chamber 32*d* and so as to be movable relative to the fourth bore 72 by the fluid contained in the fourth fluid chamber 32*d*. The twelfth bellows 34*l* is coupled about the second opening 48*b* to prevent the ingress and egress of fluid from the fourth fluid chamber 32*d* and so as to be movable relative to the second opening 48*b* by the fluid contained in the fourth fluid chamber 32*d*.

It should be noted that the sixth bellows 34*f*, the seventh bellows 34*g*, the tenth bellows 34*j* and the eleventh bellows 34*k* each have a diameter that is smaller than a diameter of the remaining bellows, bellows 34*a*-34*e*, 34*h*-34*i*, 34*l*. As the sixth bellows 34*f*, the seventh bellows 34*g*, the tenth bellows 34*j* and the eleventh bellows 34*k* have a smaller diameter, the sixth bellows 34*f*, the seventh bellows 34*g*, the tenth bellows 34*j* and the eleventh bellows 34*k* are required to move more or have a larger stroke to generate or transfer the same amount of force as the fifth bellows 34*e*, the eighth bellows 34*h*, the ninth bellows 34*i* and the twelfth bellows 34*l* through the fluid in the respective one of the third fluid chamber 32*c* and the fourth fluid chamber 32*d*. In one example, sixth bellows 34*f*, the seventh bellows 34*g*, the tenth bellows 34*j* and the eleventh bellows 34*k* provides about ±0.5 inches of stroke. It should be understood, however, that the sixth bellows 34*f*, the seventh bellows 34*g*, the tenth bellows 34*j* and the eleventh bellows 34*k* may have any desired amount of stroke based on the desired amount of force transfer. Moreover, the bellows 34*a*-34*e*, 34*h*-34*i*, 34*l* may have any desired amount of stroke based on the desired amount of force transfer. In addition, the smaller area of the sixth bellows 34*f*, the seventh bellows 34*g*, the tenth bellows 34*j* and the eleventh bellows 34*k* minimizes the impact on the fluid coupling between the pilot input system 24 and the flight output system 28, such that forces backdriven through the flight output system 28 are directed to the pilot input system 24 without interfering with the stability augmentation system 26. Each of the bellows 34*a*-34*l* are also coupled to a portion of a respective one of the trim input system 22, the pilot input system 24, the stability augmentation system 26 and the flight output system 28, as will be discussed further herein.

The trim input system 22 maintains the position of a portion of the pilot input system 24, and also adjusts or re-centers the stability augmentation system 26. In one example, the trim input system 22 includes an actuator 102, a brake 104, an output shaft 106, a first feel spring assembly 108 and a second feel spring assembly 110. The actuator 102 comprises a linear actuator, which is backdrivable. Generally, the actuator 102 is a lower bandwidth actuator, which has a higher stroke. The actuator 102 is responsive to one or more control signals or an electric current to move or translate the output shaft 106 based on a position of the brake 104. When the brake 104 is released or in a released position, the movement or translation of the output shaft 106 causes the output shaft 106 to move against a respective one of the first bellows 34*a* and the third bellows 34*c,* thereby adjusting a position of a stick 112 of the pilot input system 24.

The brake 104 is coupled to the actuator 102, and controls the movement of the output shaft 106 by the actuator 102. The brake 104 is responsive to one or more control signals or to an electric current to move between a first, engaged position and a second, released position. In the first, engaged position, the brake 104 generally prevents the movement of the output shaft 106 by the actuator 102. In the second, released position, the brake 104 enables the movement of the output shaft 106 by the actuator 102, thereby allowing the repositioning of the stick 112 freely. In the first, engaged position, the stick 112 is movable relative to the housing 30 against a force of the first feel spring assembly 108 and the second feel spring assembly 110, but after movement or when released by the pilot, the stick 112 returns to the position set by the trim input system 22.

The output shaft 106 is coupled to and movable by the actuator 102. In one example, the output shaft 106 is generally cylindrical, and has a first end 114 and a second end 116. Each of the first end 114 and the second end 116 include a stop 118. The stop 118 serves as a mechanical stop to prevent the further movement of the output shaft 106 by the actuator 102.

The first feel spring assembly 108 is coupled to the stop 118 associated with the first end 114 of the output shaft 106. The first feel spring assembly 108 includes a spring housing 120 and a spring 122. The spring housing 120 is substantially cylindrical or cup-shaped, having a first housing end 124 coupled to the stop 118 and a second housing end 126 adjacent to the first bellows 34*a*. It should be noted, however, that the spring housing 120 may have any desired shape. Generally, the first housing end 124 is coupled about the stop 118 such that the stop 118 is received within the spring housing 120 and the stop 118 is movable within the spring housing 120 upon receipt of an input to the third bellows 34*c*. Thus, the first housing end 124 may be coupled about the stop 118 by defining a bore 124*a* having a diameter, which is less than a diameter of the stop 118. The spring 122 is received within the spring housing 120, so as to be positioned between the first housing end 124 and the second housing end 126. In one example, the spring 122 is a metal coil spring. It should be noted, however, that the spring 122 may comprise any suitable biasing member known to one skilled in the art for biasing against the stop 118 and the second housing end 126. For example, the spring 122 may comprise a torsion bar feel spring or flexure assembly, as described in U.S. Pat. No. 8,262,479, the relevant content of which is incorporated by reference herein.

The second feel spring assembly 110 is coupled to the stop 118 associated with the second end 116 of the output shaft 106. The second feel spring assembly 110 includes a second spring housing 128 and a second spring 130. The second spring housing 128 is substantially cylindrical or cup-shaped, having a third housing end 132 coupled to the stop 118 and a fourth housing end 134 adjacent to the third bellows 34*c*. Generally, the third housing end 132 is coupled about the stop 118 such that the stop 118 is received within the second spring housing 128 and the stop 118 is movable within the second spring housing 128 upon receipt of an input to the first bellows 34*a*. Thus, the third housing end 132 may be coupled about the stop 118 by defining a bore 132*a* having a diameter, which is less than a diameter of the stop 118. The second spring 130 is received within the second spring housing 128, so as to be positioned between the third housing end 132 and the fourth housing end 134. In one example, the second spring 130 is a metal coil spring. It should be noted, however, that the second spring 130 may comprise any suitable biasing member known to one skilled in the art for biasing against the stop 118 and the fourth housing end 134. For example, the second spring 130 may comprise a torsion bar feel spring or flexure assembly, as described in U.S. Pat. No. 8,262,479, the relevant content of which is incorporated by reference herein. Moreover, the second spring 130 may be the same type of spring as the spring 122.

The pilot input system 24 includes the stick 112, and is responsive to input from the pilot of the aircraft 12 to control the flight surfaces 14 via the flight output system 28. The pilot input system 24 is also responsive to the flight output system 28 to generate output to the stick 112 based on input received from the flight output system 28. In one example, the pilot input system 24 includes the stick 112, which is coupled to a first control coupling 136, a second control coupling 138 and a pivot coupling 140.

The stick 112 comprises any suitable input device for receiving input from the pilot of the aircraft 12 (FIG. 1). In one example, the stick 112 is substantially cylindrical, however, the stick 112 can have any desired shape. While not illustrated herein as including a grip surface, the stick 112 may also include one or more surfaces to facilitate the manipulation of the stick 112. The stick 112 generally extends along an axis, which is transverse to the longitudinal axis L. The stick 112 is movable by the pilot within the slot 50 at a plurality of positions, each generally transverse to the longitudinal axis L. The stick 112 has a first stick end 142 and a second stick end 144. The first stick end 142 is positioned outside of the manifold 20, and for example, extends into a cockpit associated with the aircraft 12, to receive the input from the pilot. The second stick end 144 is coupled to the second control coupling 138 and is received within the manifold 20. Generally, a majority of the stick 112 is received within the second branch 46*b* so as to be movable within the manifold 20 in the area defined by the second branch 46*b*.

The first control coupling 136 is coupled to the stick 112 near the first stick end 142 and extends in a direction substantially parallel to the longitudinal axis L of the housing 30 within the manifold 20. Generally, the first control coupling 136 couples the stick 112 to the second bellows 34*b* and the fifth bellows 34*e*. In one example, the first control coupling 136 includes a first coupling portion 146 and a first control arm 148.

The first coupling portion 146 couples the stick 112 to the first control arm 148. In one example, the first coupling portion 146 comprises a pin or other suitable mechanical fastener (e.g. a nut and bolt), which is received through a bore 112*a* defined in the stick 112 to couple the first control arm 148 to the stick 112. In the example of the first coupling portion 146 comprising a pin, the pin may be press-fit into the bore 112*a* to fixedly couple the stick 112 to the first control arm 148 with little to no rotational movement between the first control arm 148 and the stick 112.

The first control arm 148 is coupled by the first coupling portion 146 to the stick 112. In one example, the first control arm 148 includes a bore 148*a*, which receives the first coupling portion 146 to couple the first control arm 148 to the stick 112. The first control arm 148 includes a first control end 150 and a second control end 152. The first control end 150 is fixedly coupled to the second bellows 34*b*, and the second control end 152 is fixedly coupled to the fifth bellows 34*e*. In one example, the first control end 150 and the second control end 152 are each welded to the respective one of the second bellows 34*b* and the fifth bellows 34*e*, however, the first control end 150 and the second control end 152 may be fixedly coupled to the second bellows 34*b* and the fifth bellows 34*e* through any suitable technique, such as the use of one or more mechanical fasteners, for example, pins. By fixedly coupling the first control end 150 and the second control end 152 to the respective one of the second bellows 34*b* and the fifth bellows 34*e*, and the stick 112, the movement of the stick 112 moves the first control arm 148, and thus, the second bellows 34*b* and the fifth bellows 34*e* to move the fluid within the first fluid chamber 32*a* and third fluid chamber 32*c*. The movement of the fluid within the first fluid chamber 32*a* allows the pilot to act against the spring 122 and second spring 130 when the brake 104 is in the first, engaged position and the movement of the fluid within the third fluid chamber 32*c* causes a corresponding movement of a portion of the flight output system 28, as will be discussed in greater detail herein.

The second control coupling 138 is coupled to the stick 112 near the second stick end 144 and extends in a direction substantially parallel to the longitudinal axis L of the housing 30 within the manifold 20. Generally, the second control coupling 138 couples the stick 112 to the fourth bellows 34*d* and the ninth bellows 34*i*. In one example, the second control coupling 138 includes a second coupling portion 154 and a second control arm 156.

The second coupling portion 154 couples the stick 112 to the second control arm 156. In one example, the second coupling portion 154 comprises a pin or other suitable mechanical fastener (e.g. a nut and bolt), which is received through a bore 112*b* defined in the stick 112 to couple the second control arm 156 to the stick 112. In the example of the second coupling portion 154 comprising a pin, the pin may be press-fit into the bore 112*b* to fixedly couple the stick 112 to the second control arm 156 with little to no rotational movement between the second control arm 156 and the stick 112.

The second control arm 156 is coupled by the second coupling portion 154 to the stick 112. In one example, the second control arm 156 includes a bore 156*a*, which receives the second coupling portion 154 to couple the second control arm 156 to the stick 112. The second control arm 156 includes a third control end 158 and a fourth control end 160. The third control end 158 is fixedly coupled to the fourth bellows 34*d*, and the fourth control end 160 is fixedly coupled to the ninth bellows 34*i*. In one example, the third control end 158 and the fourth control end 160 are each welded to the respective one of the fourth bellows 34*d* and the ninth bellows 34*i*, however, the third control end 158 and the fourth control end 160 may be fixedly coupled to the fourth bellows 34*d* and the ninth bellows 34*i* through any suitable technique, such as the use of one or more mechanical fasteners, for example, pins. By fixedly coupling the third control end 158 and the fourth control end 160 to the respective one of the fourth bellows 34*d* and the ninth bellows 34*i*, and the stick 112, the movement of the stick 112 moves the second control arm 156, and thus, the fourth bellows 34*d* and the ninth bellows 34*i* to move the fluid within the second fluid chamber 32*b* and fourth fluid chamber 32*d*. The movement of the fluid within the second fluid chamber 32*b* allows the pilot to act against the spring 122 and second spring 130 when the brake 104 is in the first, engaged position and the movement of the fluid within the fourth fluid chamber 32*d* causes a corresponding movement of a portion of the flight output system 28, as will be discussed in greater detail herein The pivot coupling 140 enables the stick 112 to pivot within the housing 30. In one example, the pivot coupling 140 pivotally couples the stick 112 to the first support arm 62 of the intermediate support portion 44. In one example, the pivot coupling 140 comprises a pivot pin, which is received within a bore 112*c* defined through the stick 112 and a bore 140*a* defined through the first support arm 62. Generally, the pivot coupling 140 is coupled to the bore 112*c* and the bore 140*a* to enable the stick 112 to move or pivot relative to the first intermediate side 52 about the pivot coupling 140. It should be noted that the use of a pivot pin is merely exemplary, as the pivot coupling 140 may comprise any suitable device to create a pivot point for the stick 112.

The stability augmentation system 26 controls or adjusts the flight output system 28 independently of the pilot input system 24 to ensure stable movement of the flight surfaces 14, such as the swashplate 14*a* (FIG. 1). In one example, with reference to FIG. 2, the stability augmentation system 26 includes a first stability augmentation actuator 162, a first stability output shaft 164, one or more first centering springs 166, a second stability augmentation actuator 168, a second stability output shaft 170 and one or more second centering springs 172. The second stability augmentation actuator 168, the second stability output shaft 170 and the one or more second centering springs 172 may be identical to or substantially similar to the first stability augmentation actuator 162, the first stability output shaft 164 and the one or more first centering springs 166 to provide a redundant system for safety purposes.

The first stability augmentation actuator 162 comprises a linear actuator, which is backdrivable. In one example, the first stability augmentation actuator 162 comprises a voice coil, which has a high bandwidth, lower stroke and is non-jamming. The first stability augmentation actuator 162 is responsive to one or more control signals and/or an electric current to move the first stability output shaft 164. As the control of the first stability augmentation actuator 162 to adjust a flight surface is generally known to one skill in the art, the control of the first stability augmentation actuator 162 will not be discussed in great detail herein. The first stability augmentation actuator 162 substantially continuously adjusts the output of an output linkage 182 associated with the flight output system 28 to stabilize the aircraft, independently of pilot input.

The first stability output shaft 164 is coupled to and movable by the first stability augmentation actuator 162. The first stability output shaft 164 has a first end 174 and a second end 176. The first end 174 is fixedly coupled to the sixth bellows 34*f* and the second end 176 is fixedly coupled to the seventh bellows 34*g*. In one example, the first end 174 is welded to the sixth bellows 34*f* and the second end 176 is welded to the seventh bellows 34*g* ; however, it will be understood that the first end 174 and the second end 176 may be fixedly coupled to the respective one of the sixth bellows

34*f* and the tenth bellows 34*j* through any suitable technique, such as one or more mechanical fasteners, for example, pins. By fixedly coupling the first stability output shaft 164 to the sixth bellows 34*f* and the tenth bellows 34*j*, the movement of the first stability output shaft 164 causes movement of the sixth bellows 34*f* and the tenth bellows 34*j*, and thus, the fluid within the respective one of the third fluid chamber 32*c* and the fourth fluid chamber 32*d*, which adjusts the output of the flight output system 28.

The one or more first centering springs 166 are coupled about the first stability output shaft 164 to aid in maintaining a central positon of the first stability output shaft 164 relative to the third fluid chamber 32*c* and the fourth fluid chamber 32*d* in the event of an event or issue with the first stability augmentation actuator 162. In one example, the one or more first centering springs 166 comprise a centering spring 166*a* and a centering spring 166*b*. The centering springs 166*a*, 166*b* comprise metal coil springs, in one example, however, the centering springs 166*a*, 166*b* may comprise any suitable biasing member. The one or more first centering springs 166 also maintain a central position of the first stability output shaft 164 in the case of an issue or event with the first stability augmentation actuator 162. While not illustrated herein, the one or more first centering springs 166 may include a mechanism to provide a breakout force, such as a spring housing, similar to the spring housing 120.

The second stability augmentation actuator 168 comprises a linear actuator, which is backdrivable. In one example, the second stability augmentation actuator 168 comprises a voice coil, which has a high bandwidth, lower stroke and is non-jamming. The second stability augmentation actuator 168 is responsive to one or more control signals and/or an electric current to move the second stability output shaft 170. As the control of the second stability augmentation actuator 168 to adjust a flight surface is generally known to one skill in the art, the control of the second stability augmentation actuator 168 will not be discussed in great detail herein. The second stability augmentation actuator 168 substantially continuously adjusts the output of the output linkage 182 associated with the flight output system 28 to stabilize the aircraft, independently of pilot input. Generally, both of the first stability augmentation actuator 162 and the second stability augmentation actuator 168 together provide full authority for the position and force output to the output linkage 182, one of the first stability augmentation actuator 162 and the second stability augmentation actuator 168 working alone provides half authority and when the first stability augmentation actuator 162 and the second stability augmentation actuator 168 move in opposite directions, there is substantially no output to the output linkage 182.

The second stability output shaft 170 is coupled to and movable by the second stability augmentation actuator 168. The second stability output shaft 170 has a first end 178 and a second end 180. The first end 178 is fixedly coupled to the seventh bellows 34*g* and the second end 180 is fixedly coupled to the eleventh bellows 34*k*. In one example, the first end 178 is welded to the seventh bellows 34*g* and the second end 180 is welded to the eleventh bellows 34*k*; however, it will be understood that the first end 178 and the second end 180 may be fixedly coupled to the respective one of the seventh bellows 34*g* and the eleventh bellows 34*k* through any suitable technique, such as one or more mechanical fasteners, for example, pins. By fixedly coupling the second stability output shaft 170 to the seventh bellows 34*g* and the eleventh bellows 34*k*, the movement of the second stability output shaft 170 causes movement of the seventh bellows 34*g* and the eleventh bellows 34*k*, and thus, the fluid within the respective one of the third fluid chamber 32*c* and the fourth fluid chamber 32*d*, which adjusts the output of the flight output system 28.

The one or more second centering springs 172 are coupled about the second stability output shaft 170 to aid in maintaining a central positon of the second stability output shaft 170 relative to the third fluid chamber 32*c* and the fourth fluid chamber 32*d* in the event of an event or issue with the second stability augmentation actuator 168. In one example, the one or more second centering springs 172 comprise a second centering spring 172*a* and a second centering spring 172*b*. The second centering springs 172*a*, 172*b* comprise metal coil springs, in one example, however, the second centering springs 172*a*, 172*b* may comprise any suitable biasing member. The one or more second centering springs 172 also maintain a central position of the second stability output shaft 170 in the case of an issue or event with the second stability augmentation actuator 168.

The flight output system 28 is coupled to the swashplate 14*a* to control the rotor blade 14*b* (FIG. 1) based on input received from the pilot input system 24 and/or the stability augmentation system 26. In this regard, with reference to FIG. 2, the flight output system 28 is coupled to the pilot input system 24 via the third fluid chamber 32*c* and the fourth fluid chamber 32*d* such that the movement of the stick 112 results in a corresponding movement of the flight output system 28, and the stability augmentation system 26 is coupled to the third fluid chamber 32*c* and the fourth fluid chamber 32*d* such that movement of the first stability output shaft 164 and/or the second stability output shaft 170 also results in a corresponding movement of the flight output system 28. The ratio of the movement varies based on the stability augmentation system 26. In one example, the flight output system 28 includes the output linkage 182, a third control coupling 184, a fourth control coupling 186 and a second pivot coupling 188.

The output linkage 182 comprises any suitable output linkage that is able to be coupled to the swashplate 14*a* (FIG. 1). In one example, with reference to FIG. 2, the output linkage 182 is substantially cylindrical; however, the output linkage 182 can have any desired shape. While not illustrated herein as including a coupling surface or coupling interface, the output linkage 182 may also include one or more surfaces or features, such as bores, to facilitate coupling the output linkage 182 to the swashplate 14*a*. The output linkage 182 generally extends along an axis, which is transverse to the longitudinal axis L. The output linkage 182 is movable by the pilot input system 24 between a plurality of positions relative to the manifold 20, each generally transverse to the longitudinal axis L. The output linkage 182 has a first linkage end 190 and a second linkage end 192. The first linkage end 190 is positioned outside of the manifold 20 and is able to be coupled to the swashplate 14*a* to provide input to the swashplate 14*a*. The first linkage end 190 may be coupled to the swashplate 14*a* through any suitable technique known to one skilled in the art, such as mechanical fasteners, etc. The second linkage end 192 is coupled to the fourth control coupling 186. Generally, the output linkage 182 extends outside of the manifold 20 and is movable relative to the manifold 20.

The third control coupling 184 is coupled to the output linkage 182 near the first linkage end 190 and extends in a direction substantially parallel to the longitudinal axis L of the housing 30. Generally, the third control coupling 184 couples the output linkage 182 to the eighth bellows 34*h*. In one example, the third control coupling 184 includes a third coupling portion 194 and a third control arm 196.

The third coupling portion 194 couples the output linkage 182 to the third control arm 196. In one example, the third coupling portion 194 comprises a pin or other suitable mechanical fastener (e.g. a nut and bolt), which is received through a bore 182*a* defined in the output linkage 182 to couple the third control arm 196 to the output linkage 182. In the example of the third coupling portion 194 comprising a pin, the pin may be press-fit into the bore 182*a* to fixedly couple the output linkage 182 to the third control arm 196 with little to no rotational movement between the third control arm 196 and the output linkage 182.

The third control arm 196 is coupled by the third coupling portion 194 to the output linkage 182. In one example, the third control arm 196 includes a bore 196*a* near a first end 198, which receives the third coupling portion 194 to couple the third control arm 196 to the output linkage 182. The third control arm 196 includes a control end 200 spaced apart from the first end 198. The control end 200 is fixedly coupled to the eighth bellows 34*h*. In one example, the control end 200 is welded to the eighth bellows 34*h*, however, the control end 200 may be fixedly coupled to the eighth bellows 34*h* through any suitable technique, such as the use of one or more mechanical fasteners, for example, pins. By fixedly coupling the control end 200 to the eighth bellows 34*h* and the output linkage 182, the movement of the fluid within the third fluid chamber 32*c* by the stick 112 or the stability augmentation system 26 moves the control end 200, and thus, the eighth bellows 34*h*, to move the output linkage 182. The movement of the output linkage 182 results in a corresponding movement of the swashplate 14*a*, and thus, the rotor blade 14*b* (FIG. 1).

With reference to FIG. 2, the fourth control coupling 186 is coupled to the output linkage 182 near the second linkage end 192 and extends in a direction substantially parallel to the longitudinal axis L of the housing 30. Generally, the fourth control coupling 186 couples the output linkage 182 to the twelfth bellows 341. In one example, the fourth control coupling 186 includes a fourth coupling portion 202 and a fourth control arm 204.

The fourth coupling portion 202 couples the output linkage 182 to the fourth control arm 204. In one example, the fourth coupling portion 202 comprises a pin or other suitable mechanical fastener (e.g. a nut and bolt), which is received through a bore 182*b* defined in the output linkage 182 to couple the fourth control arm 204 to the output linkage 182. In the example of the fourth coupling portion 202 comprising a pin, the pin may be press-fit into the bore 182*b* to fixedly couple the output linkage 182 to the fourth control arm 204 with little to no rotational movement between the fourth control arm 204 and the output linkage 182.

The fourth control arm 204 is coupled by the fourth coupling portion 202 to the output linkage 182. In one example, the fourth control arm 204 includes a bore 204*a* with near a first end 206, which receives the fourth coupling portion 202 to couple the fourth control arm 204 to the output linkage 182. The fourth control arm 204 includes a control end 208 spaced apart from the first end 206. The control end 208 is fixedly coupled to the twelfth bellows 34*l*. In one example, the control end 208 is welded to the twelfth bellows 34*l*, however, the control end 208 may be fixedly coupled to the twelfth bellows 34*l* through any suitable technique, such as the use of one or more mechanical fasteners, for example, pins. By fixedly coupling the control end 208 to the twelfth bellows 341 and the output linkage 182, the movement of the fluid within the fourth fluid chamber 32*d* by the output linkage 182 or the stability augmentation system 26 moves the control end 208, and thus, the twelfth bellows 34*l*, to move the output linkage 182. The movement of the output linkage 182 results in a corresponding movement of the swashplate 14*a*, and thus, the rotor blade 14*b* (FIG. 1).

With reference to FIG. 2, the second pivot coupling 188 enables the output linkage 182 to pivot relative to the housing 30 based on the input from the pilot input system 24. In one example, the second pivot coupling 188 pivotally couples the output linkage 182 to the second support arm 64 of the intermediate support portion 44. In one example, the output linkage 182 comprises a pivot pin, which is received within a bore 182*c* defined through the output linkage 182 and a bore 188*a* defined through the second support arm 64. Generally, the second pivot coupling 188 is coupled to the bore 182*c* and the bore 188*a* to enable the output linkage 182 to move or pivot relative to the second intermediate side 54 and the second side 38 of the housing 30 about the second pivot coupling 188. It should be noted that the use of a pivot pin is merely exemplary, as the second pivot coupling 188 may comprise any suitable device to create a pivot point for the output linkage 182.

In one example, the automatic flight servo system 10 is assembled once the manifold 20 formed through a suitable method, such as casting, milling, etc., and the bellows 34*a*-34*l* are coupled to the respective openings or bores within the manifold 20. It should be noted that while the manifold 20 is illustrated herein as comprising a single integrally formed part, the manifold 20 may comprise a number of parts separately formed and coupled together through suitable techniques, such as welding, mechanical fasteners, etc. The hydraulic fluid may be introduced into the fluid chambers 32*a*-32*d* once the fluid chambers 32*a*-32*d* are defined, and the first control arm 148 and the second control arm 156 are fixedly coupled to the respective one of the second bellows 34*b*, sixth bellows 34*f*, fourth bellows 34*d* and ninth bellows 34*i*. The stick 112 is pivotally coupled to the pivot coupling 140 and coupled to the first control arm 148 and the second control arm 156 via the respective one of the first coupling portion 146 and the second coupling portion 154. The third control arm 196 is fixedly coupled to the eighth bellows 34*h*, and the fourth control arm 204 is fixedly coupled to the twelfth bellows 341. The output linkage 182 is pivotally coupled to the second pivot coupling 188, and coupled to the third control arm 196 and the fourth control arm 204 via the respective one of the third coupling portion 194 and the fourth coupling portion 202.

With the brake 104 coupled to the actuator 102, the actuator 102 coupled to the output shaft 106, the first feel spring assembly 108 and the second feel spring assembly 110 are coupled to the output shaft 106. The first feel spring assembly 108 and the second feel spring assembly 110 are coupled to the output shaft 106 such that the spring housing 120 is coupled about the stop 118 of the first end 114 with the spring 122 contained in the spring housing 120, and the second spring housing 128 is coupled about the stop 118 of the second end 116 with the second spring 130 contained within the second spring housing 128. The spring housing 120 is adjacent to, but not coupled to the first bellows 34*a* and the second spring housing 128 is adjacent to, but not coupled to the third bellows 34*c*, and the actuator 102 and the brake 104 are positioned within the first branch 46*a* of the recessed portion 46.

With the first stability augmentation actuator 162 coupled to the first stability output shaft 164, and the one or more first centering springs 166 coupled about the first stability output shaft 164, and the first stability output shaft 164, the first stability augmentation actuator 162 and the one or more first centering springs 166 are positioned within the third cavity 60*c*. The first end 174 of the first stability output shaft 164 is fixedly coupled to the sixth bellows 34*f*, and the second end 176 of the first stability output shaft 164 is fixedly coupled to the tenth bellows 34*j*. Then, with the second stability augmentation actuator 168 coupled to the second stability output shaft 170, and the one or more second centering springs 172 coupled about the second stability output shaft 170, and the second stability output shaft 170, the second stability augmentation actuator 168 and the one or more second centering springs 172 are positioned within the third cavity 60*c*. The first end 178 of the second stability output shaft 170 is fixedly coupled to the seventh bellows 34*g*, and the second end 180 of the second stability output shaft 170 is fixedly coupled to the eleventh bellows 34*k*.

With the automatic flight servo system 10 assembled, the automatic flight servo system 10 is coupled to the aircraft 12, and the first linkage end 190 of the output linkage 182 is coupled to the swashplate 14*a*, and the swashplate 14*a* is coupled to the rotor blade 14*b* (FIG. 1). In use, with reference to FIG. 2, the first stability output shaft 164 and the second stability output shaft 170 are generally centered relative to the third fluid chamber 32*c* and the fourth fluid chamber 32*d*. The stick 112 is positioned in a null, detent or preset position and the brake 104 is in the first, engaged position such that the position of the stick 112 returns to the null, detent or preset position after input is received by the pilot.

Figure 3:
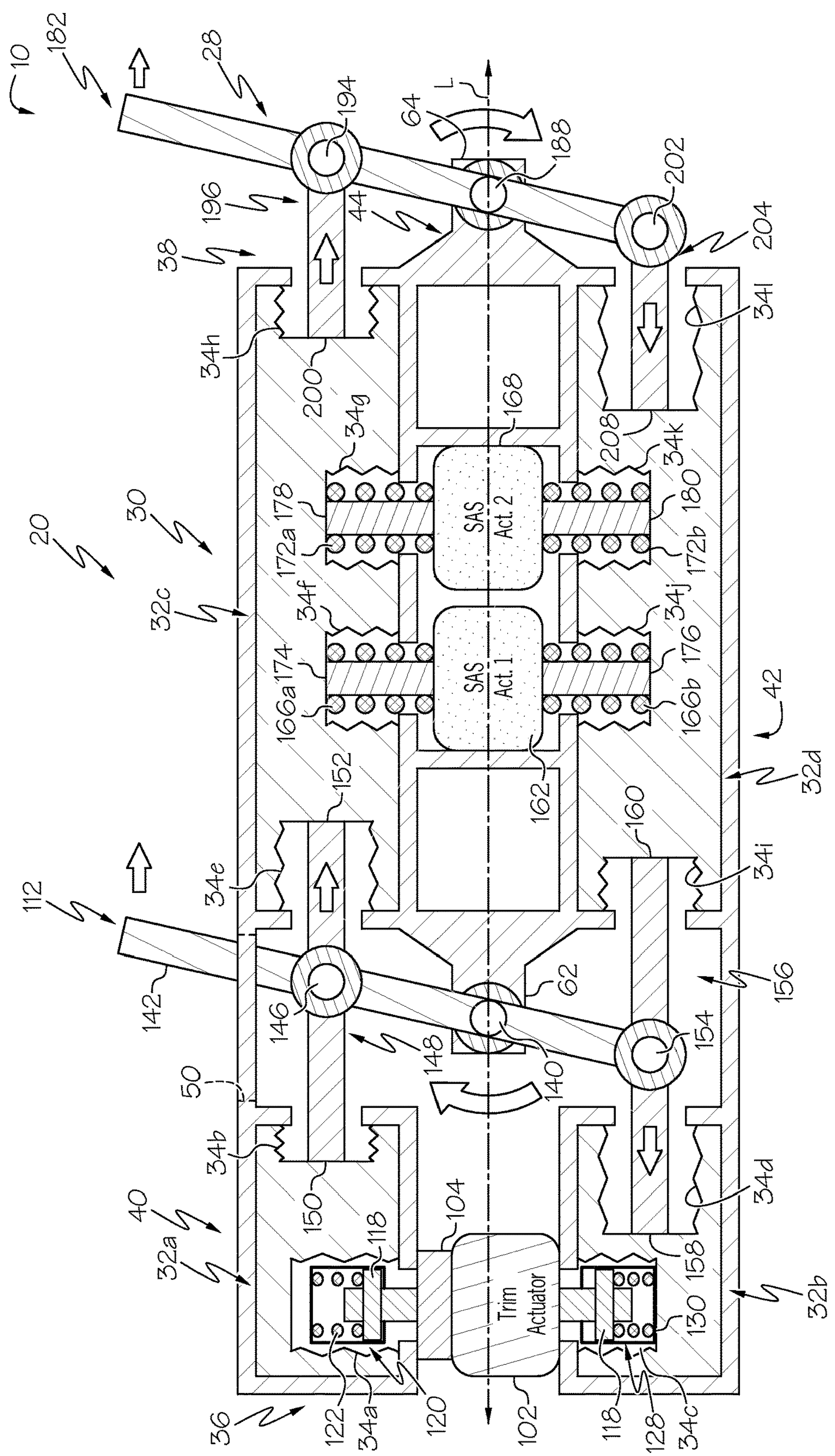
FIG. 3 is a schematic cross-sectional illustration of the compact hydrostatic automatic flight servo system of FIG. 1, taken along line 2-2 of FIG. 1, illustrating the compact hydrostatic automatic flight servo system in a second position in accordance with various embodiments.

With reference to FIG. 3, upon receipt of an input from the pilot that moves the stick 112 towards the second end 38 of the housing 30, the movement of the stick 112 towards the second end 38 of the housing 30 causes the first control arm 148 to move towards the second end 38 of the housing 30 and the pivot coupling 140 to pivot the stick 112 near the second stick end 144 such that the second control arm 156 moves towards the first end 36 of the housing 30. The movement of the first control arm 148 expands the fifth bellows 34*e*, while compressing the second bellows 34*b*. The expansion of the fifth bellows 34*e* causes the compression of the eighth bellows 34*h*, which forces the third control arm 196 outward and away from the housing 30.

The contraction of the second bellows 34*b* causes the first bellows 34*a* to expand, thereby elongating the spring 122. The movement of the second control arm 156 towards the first end 36 of the housing 30 expands the fourth bellows 34*d* and compresses the ninth bellows 34*i*. The expansion of the fourth bellows 34*d* causes the compression of the third bellows 34*c*, which causes the second spring 130 to compress.

The compression of the ninth bellows 34*i* cooperates with the movement of the output linkage 182 to cause the expansion of the twelfth bellows 341. The movement of the third control arm 196 outward away from the housing 30 causes the output linkage 182 to pivot about the second pivot coupling 188, and moves the second linkage end 192 of the output linkage 182 towards the second end 38 of the housing 30, thereby cooperating to expand the twelfth bellows 341. As illustrated in FIG. 3, the input from the pilot to the stick 112 is translated via the third fluid chamber 32*c* and the fourth fluid chamber 32*d* to result in the substantially same output for the output linkage 182. The movement of the output linkage 182 results in a corresponding movement of the swashplate 14*a*, and thus, the rotor blade 14*b*. Once the pilot input is removed from the stick 112, the stick 112 returns to the null, default or preset position, as illustrated in FIG. 2. It should be understood based on the foregoing description that a movement of the stick 112 towards the first end 36 of the housing 30 would result in a corresponding movement of the output linkage 182.

Figure 4:
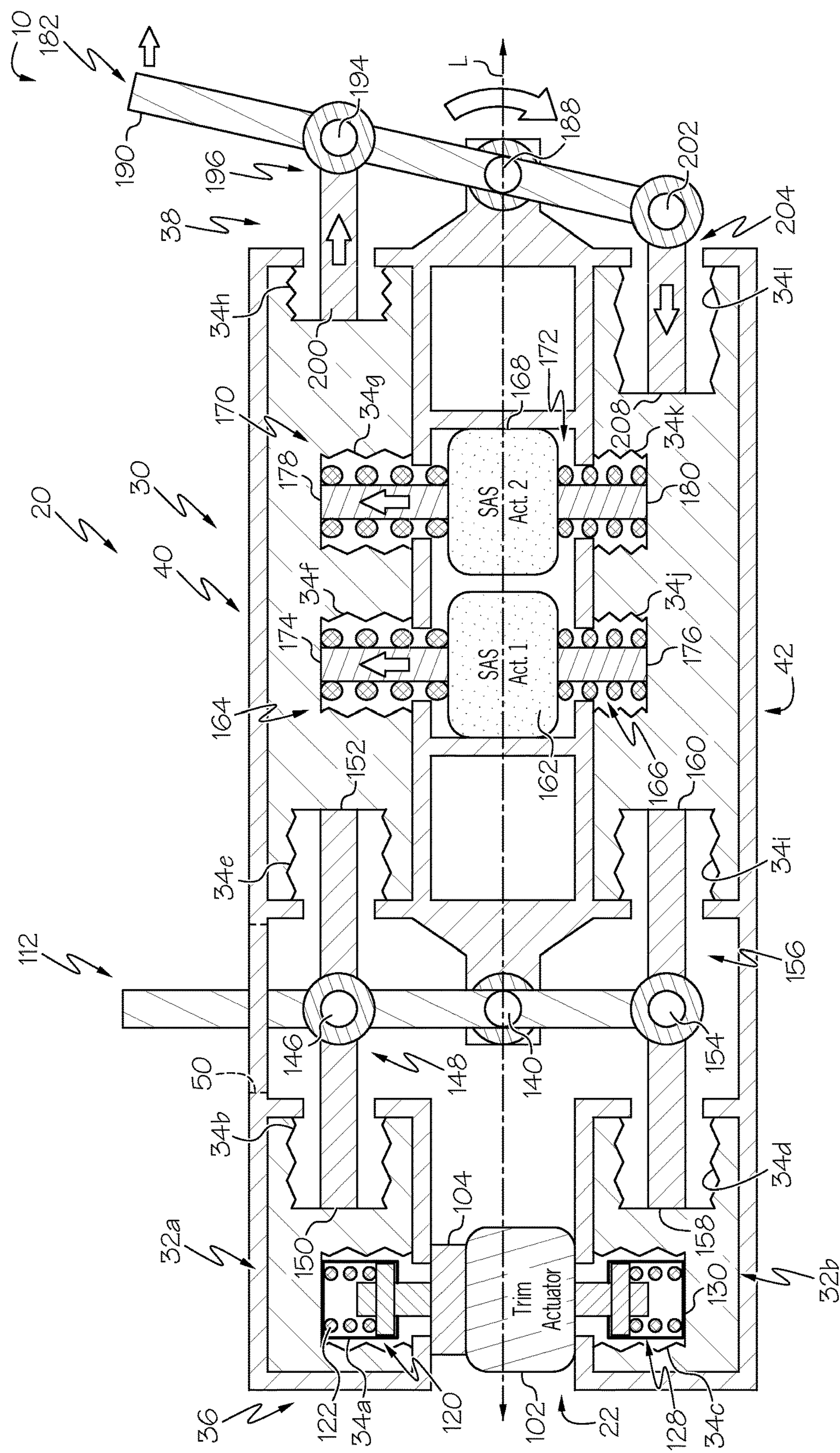
FIG. 4 is a schematic cross-sectional illustration of the compact hydrostatic automatic flight servo system of FIG. 1, taken along line 2-2 of FIG. 1, illustrating the compact hydrostatic automatic flight servo system in a third position in accordance with various embodiments.

With reference to FIG. 4, FIG. 4 illustrates the stability augmentation system 26 adjusting the movement of the output linkage 182. In the example of FIG. 4, the stick 112 is in the null, default or preset position, and the brake 104 is in the first, engaged position to return the stick 112 to the null position upon receipt of a pilot input. In this example, however, the pilot does not apply an input to the stick 112, but rather, the stability augmentation system 26 adjusts the output linkage 182 based on the receipt of the one or more control signals. For example, the first stability augmentation actuator 162 and the second stability augmentation actuator 168 move the first stability output shaft 164 and the second stability output shaft 170 toward the third side 40 of the housing 30. The movement of the first stability output shaft 164 and the second stability output shaft 170 toward the third side 40 of the housing 30 expands the sixth bellows 34*f* and the seventh bellows 34*g*, respectively, while compressing the tenth bellows 34*j* and the eleventh bellows 34*k*, respectively. The expansion of the sixth bellows 34*f* and the seventh bellows 34*g* causes the compression of the eighth bellows 34*h*, which in turn, moves or pushes the third control arm 196 outward from the housing 30, thereby moving the output linkage 182 outward from the housing 30. The outward movement of the output linkage 182 moves the swashplate 14*a*, and thus, the rotor blade 14*b* (FIG. 1).

With reference to FIG. 4, the compression of the tenth bellows 34*j* and the eleventh bellows 34*k* cooperates with the movement of the fourth control arm 204 towards the second end 38 of the housing 30 (from the pivoting of the output linkage 182). The movement of the fourth control arm 204 expands the twelfth bellows 341. Thus, the stability augmentation system 26 may move the flight output system 28 independent of the pilot input system 24. It will be understood based on the foregoing description that a movement of the first stability output shaft 164 and the second stability output shaft 170 toward the fourth side 42 of the housing 30 would result in a corresponding movement of the output linkage 182.

Figure 5:
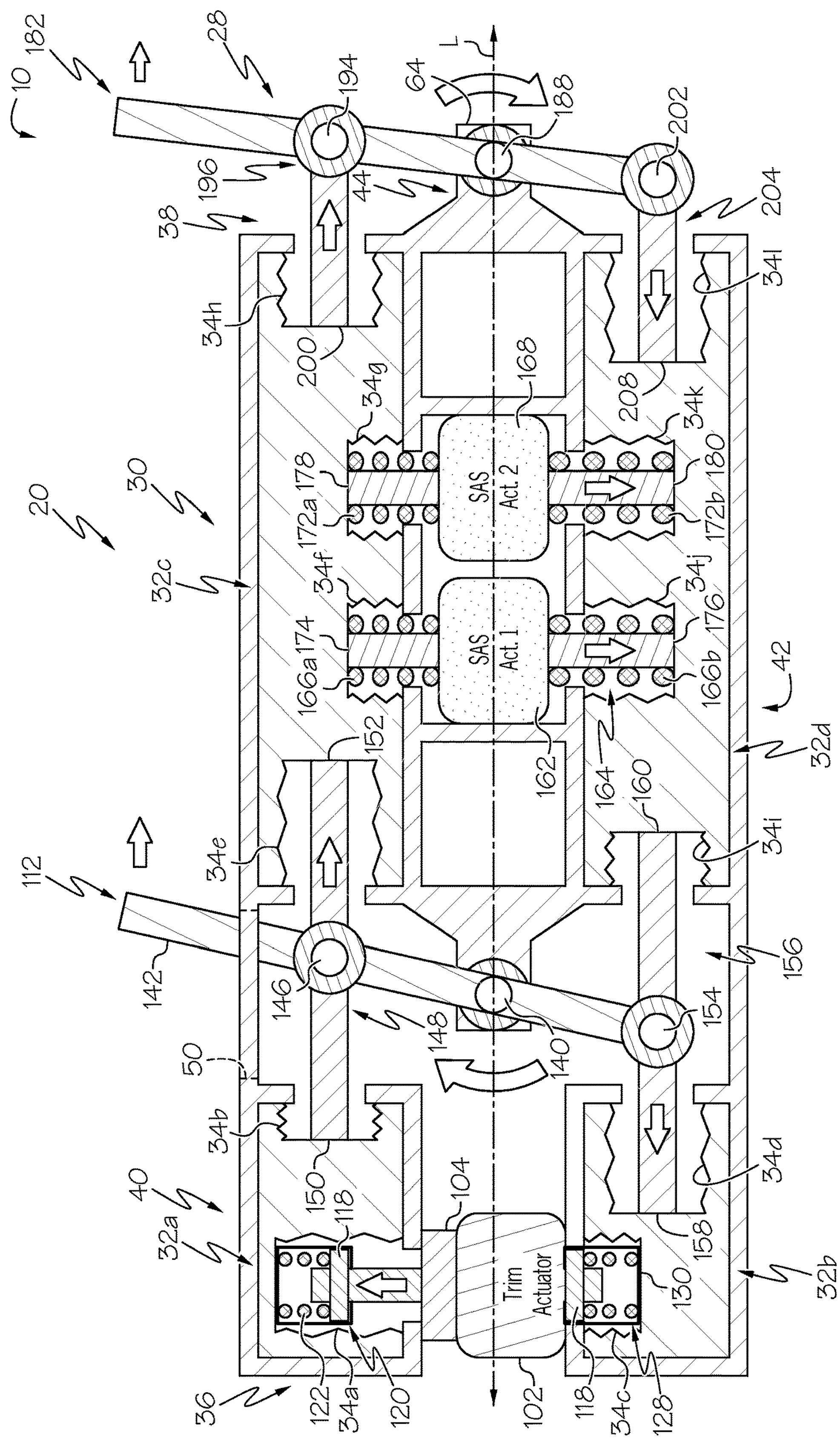
FIG. 5 is a schematic cross-sectional illustration of the compact hydrostatic automatic flight servo system of FIG. 1, taken along line 2-2 of FIG. 1, illustrating the compact hydrostatic automatic flight servo system in a fourth position in accordance with various embodiments.

With reference to FIG. 5, FIG. 5 illustrates the stability augmentation system 26 and an input from the pilot adjusting the movement of the output linkage 182. In the example of FIG. 5, the stability augmentation system 26 is augmenting the input from the pilot to adjust the output to the output linkage 182 to maintain stable flight of the aircraft 12. In this example, upon receipt of an input from the pilot that moves the stick 112 towards the second end 38 of the housing 30, the movement of the stick 112 towards the second end 38 of the housing 30 causes the first control arm 148 to move towards the second end 38 of the housing 30 and the pivot coupling 140 to pivot the stick 112 near the second stick end 144 such that the second control arm 156 moves towards the first end 36 of the housing 30. The movement of the first control arm 148 expands the fifth bellows 34*e*, while compressing the second bellows 34*b*. The expansion of the fifth bellows 34*e* causes the compression of the eighth bellows 34*h*, which forces the third control arm 196 outward and away from the housing 30.

The contraction of the second bellows 34*b* causes the first bellows 34*a* to expand, thereby elongating the spring 122. The movement of the second control arm 156 towards the first end 36 of the housing 30 expands the fourth bellows 34*d* and compresses the ninth bellows 34*i*. The expansion of the fourth bellows 34*d* causes the compression of the third bellows 34*c*, which causes the second spring 130 to compress.

The compression of the ninth bellows 34*i* cooperates with the movement of the output linkage 182 to cause the expansion of the twelfth bellows 34*l*. The movement of the third control arm 196 outward away from the housing 30 causes the output linkage 182 to pivot about the second pivot coupling 188, and moves the second linkage end 192 of the output linkage 182 towards the second end 38 of the housing 30, thereby cooperating to expand the twelfth bellows 34*l*.

Substantially simultaneously with the movement of the stick 112, the first stability augmentation actuator 162 and the second stability augmentation actuator 168 move the first stability output shaft 164 and the second stability output shaft 170 toward the fourth side 42 of the housing 30. The movement of the first stability output shaft 164 and the second stability output shaft 170 toward the fourth side 42 of the housing 30 expands the tenth bellows 34*j* and the eleventh bellows 34*k*, respectively, while compressing the sixth bellows 34*f* and the seventh bellows 34*g*, respectively. The expansion of the tenth bellows 34*j* and the eleventh bellows 34*k* causes the further compression of the ninth bellows 34*i*, which in turn, causes the further expansion of the twelfth bellows 34*l*, and thus, further movement of the fourth control arm 204 toward the first end 36 of the housing 30. Thus, the actuation of the first stability augmentation actuator 162 and the second stability augmentation actuator 168 moves the output linkage 182 towards the first side 36 of the housing 30 an additional amount based on the fluid displacement created by the expansion of the tenth bellows 34*j* and the eleventh bellows 34*k*. The movement of the output linkage 182 moves the swashplate 14*a*, and thus, the rotor blade 14*b*. Thus, in the example of FIG. 5, the input from the pilot to the stick 112 is augmented by the stability augmentation system 26 to result a modified output for the output linkage 182. The movement of the output linkage 182 results in a corresponding movement of the swashplate 14*a*, and thus, the rotor blade 14*b* (FIG. 1). Once the pilot input is removed from the stick 112, the stick 112 returns to the null, default or preset position, as illustrated in FIG. 2.

In addition, with reference to FIG. 2, the trim input system 22 also re-centers the stability augmentation system 26. In this regard, in the case that the first stability output shaft 164 and/or the second stability output shaft 170 are near the end of their available stroke, the actuator 102 may drive the output shaft 106 in a direction opposite of the extended first stability output shaft 164 and/or the second stability output shaft 170. By driving the output shaft 106 in the opposite direction, the stick 112 is moved and creates a corresponding movement of the output linkage 182. Based on the movement of the output linkage 182, the stability augmentation system 26 will move in the opposite direction (thereby re-centering the first stability output shaft 164 and/or the second stability output shaft 170) to control or adjust the movement of the output linkage 182.

Figure 6:
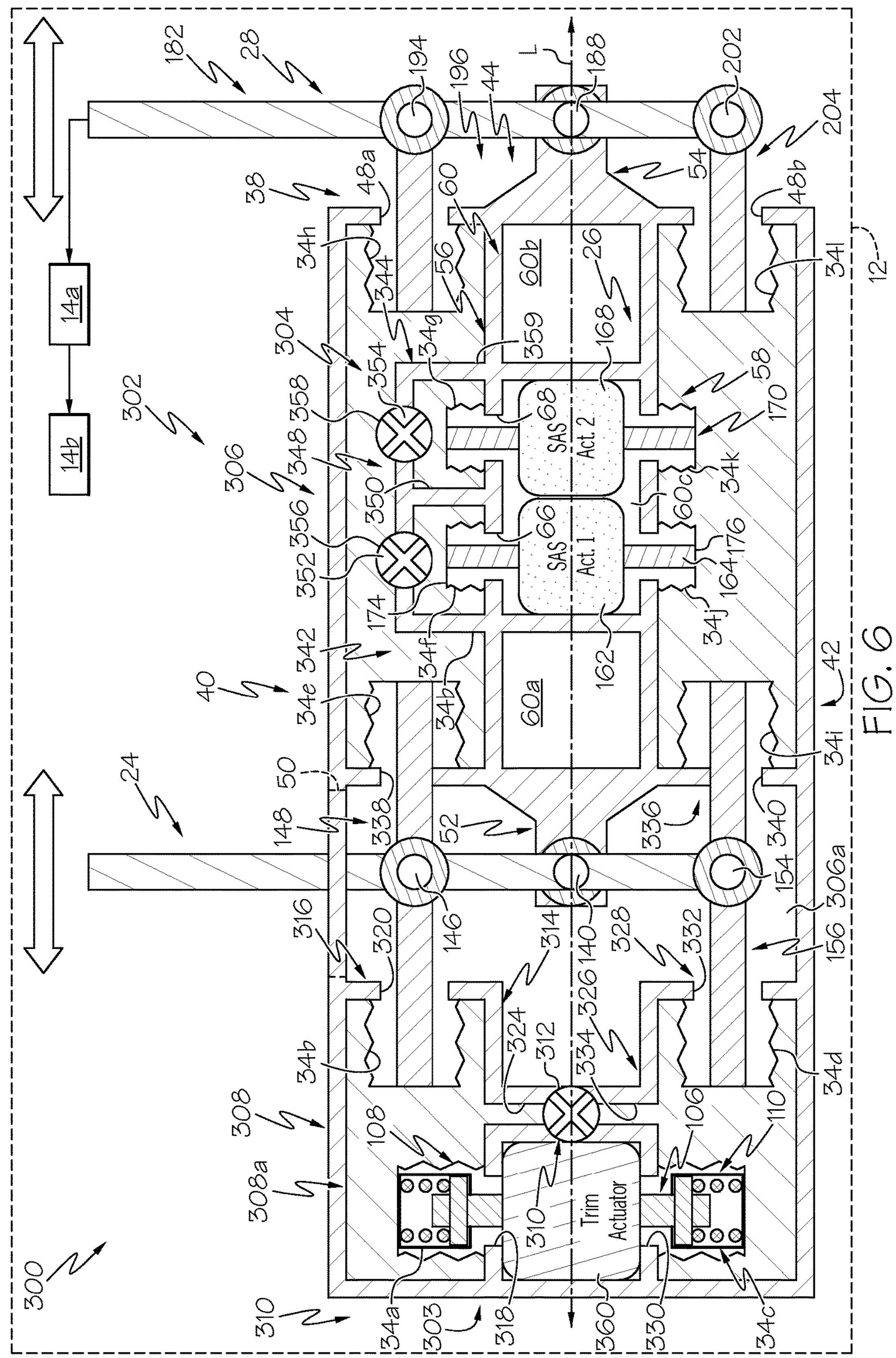
FIG. 6 is a schematic cross-sectional illustration of a compact hydrostatic automatic flight servo system in accordance with various embodiments.

With reference now to FIG. 6, a cross-sectional schematic illustration of a hydrostatic automatic flight servo system 300 is shown. As the automatic flight servo system 300 can be similar to the automatic flight servo system 10 discussed with regard to FIGS. 1-5, only the differences between the automatic flight servo system 10 and the automatic flight servo system 300 will be discussed in detail herein, with the same reference numerals used to denote the same or substantially similar components. The automatic flight servo system 300 can be employed with the aircraft 12 to provide output to the swashplate 14*a* for controlling the operation or movement of the rotor blade 14*b*. The automatic flight servo system 300 includes a manifold 302, a trim input system 303, the pilot input system 24, the stability augmentation system 26 and the flight output system 28.

The manifold 302 comprises a housing 306 that defines one or more fluid chambers 308 and includes the one or more compressible members or bellows 34. The one or more fluid chambers 308 and the one or more bellows 34 are configured to cooperate with the trim input system 303, the pilot input system 24, the stability augmentation system 26 and the flight output system 28. With reference to FIG. 2, the housing 306 comprises any desired shape to substantially enclose the one or more fluid chambers 308 and the one or more bellows 34. In one example, the housing 306 is substantially rectangular and extends along the longitudinal axis L, however, it will be understood that the housing 306 can have any desired shape. The housing 306 is comprised of any suitable material, and in one example, the housing 306 comprises a metal or a metal alloy. It should be noted that the housing 306 can comprise a suitable fiber reinforced polymeric material if desired. The housing 306 defines a first side 310, the second side 38, the third side 40, the fourth side 42 and includes the intermediate support portion 44.

The first side 310 is generally opposite the second side 38. The first side 310 and the second side 38 extend generally transverse to the longitudinal axis L. The second side 38 defines the first opening 48*a* and the second opening 48*b*. The third side 40 is defined between the first side 36 and the second side 38, and is substantially opposite the fourth side 42. The third side 40 defines the slot 50, which is sized and configured to enable the stick 112 of the pilot input system 24 to pass therethrough. The intermediate support portion 44 is defined between the third side 40 and the fourth side 42, and extends from the second side 38 towards the first side 36, such that the intermediate support portion 44 terminates with a cavity 306*a* defined by the housing 306. The intermediate support portion 44 includes the first intermediate side 52, the second intermediate side 54, the third intermediate side 56, the fourth intermediate side 58 and the one or more cavities 60. The intermediate support portion 44 serves to at least partially support the pilot input system 24 and the flight output system 28.

With continued reference to FIG. 6, the housing 306 defines the one or more fluid chambers 308. In one example, the one or more fluid chambers 308 comprise a first fluid chamber 308*a*, a second fluid chamber 308*b*, a third fluid chamber 308*c* and the fourth fluid chamber 32*d*. It will be understood, however, that the number and arrangement of the one or more fluid chambers 308 is merely exemplary, and the manifold 302 may include any number and arrangement of fluid chambers 308. In this example, the first fluid chamber 308*a* is defined generally opposite the second fluid chamber 308*b* about the longitudinal axis L, and the third fluid chamber 308*c* is defined generally opposite the fourth fluid chamber 32*d* about the longitudinal axis L. The first fluid chamber 308*a* is in fluid communication with the second fluid chamber 308*b* via a first valve 312, and the third fluid chamber 308*c* and the fourth fluid chamber 32*d* are fluidly or hydraulically isolated from each other. Each of the first fluid chamber 308*a*, the second fluid chamber 308*b*, the third fluid chamber 308*c* and the fourth fluid chamber 32*d* contain a hydraulic fluid. As is generally known in the art, a “hydrostatic fluid” is a fluid that is incompressible and static. The first fluid chamber 308*a*, the second fluid chamber 308*b*, the third fluid chamber 308*c* and the fourth fluid chamber 32*d* comprise any suitable hydraulic fluid, for example, a suitable aeronautical hydraulic fluid as known to one of ordinary skill in the art.

The first fluid chamber 308*a* is defined along the first side 310 and the third side 40 of the housing 306, and is further defined by a first wall 314 and a second wall 316 associated with the cavity 306*a* of the housing 306. The first wall 314 defines an opening or bore 318 and the second wall 316 defines a second opening or bore 320. The bore 318 is sized and configured to receive a portion of the trim input system 303, and the bore 320 is sized and configured to receive a portion of the first control arm 148 of the pilot input system 24. Generally, the trim input system 303 is movable relative to the bore 318, and the pilot input system 24 is movable relative to the bore 320. The first wall 314 also defines a first fluid passageway 324. The first fluid passageway 324 enables fluid communication between the first fluid chamber 308*a* and the second fluid chamber 308*b*, based on an opened or closed position of the first valve 312.

The second fluid chamber 308*b* is defined along the first side 310 and the fourth side 42 of the housing 306, and is further defined by a third wall 326 and a fourth wall 328 associated with the cavity 306*a* of the housing 306. The third wall 326 defines an opening or third bore 330, and the fourth wall 328 defines a second opening or fourth bore 332. The third bore 330 is sized and configured to receive a portion of the trim input system 303, and the fourth bore 332 is sized and configured to receive a portion of the second control arm 156 of the pilot input system 24. The trim input system 303 is movable relative to the third bore 330, and the pilot input system 24 is movable relative to the fourth bore 332. Generally, an axis of the third bore 330 is coaxially aligned with an axis of the bore 318 to facilitate the movement of the trim input system 303 relative to the respective ones of the bore 318 and the third bore 330. The third wall 326 also defines a second fluid passageway 334. The second fluid passageway 334 enables fluid communication between the first fluid chamber 308*a* and the second fluid chamber 308*b*, based on an opened or closed position of the first valve 312.

The first valve 312 is coupled between the first fluid passageway 324 and the second fluid passageway 334. The first valve 312 comprises any suitable electromechanical valve known to one skilled in the art, which is movable to enable or disable fluid communication between the first fluid chamber 308*a* and the second fluid chamber 308*b*. In one example, the first valve 312 comprises a shut-off valve, such as a solenoid based shut-off valve. The first valve 312 is responsive to one or more control signals and/or an electric current to move between an opened positon to enable fluid flow or a closed position to prevent fluid flow. In the closed position, the trim input system 303 is fluidly or hydraulically isolated from the first fluid chamber 308*a* and the second fluid chamber 308*b*, and in the opened position, the trim input system 303 is movable to adjust a position of the stick 112.

The third fluid chamber 308*c* is defined along the third side 40 of the housing 306 and the third intermediate side 56 of the intermediate support portion 44, and is further defined by a fifth wall 336 associated with the cavity 306*a* of the housing 306 and the second side 38 of the housing 306. The fifth wall 336 defines an opening or fifth bore 338 and an opening or sixth bore 340. The fifth bore 338 is in fluid communication with the third fluid chamber 308*c*, while the sixth bore 340 is in fluid communication with the fourth fluid chamber 308*d*. Thus, the fifth bore 338 is spaced apart from the sixth bore 340 along the fifth wall 336. The fifth bore 338 and the sixth bore 340 each receive a portion of the pilot input system 24. The first opening 48*a* of the second side 38 of the housing 30 is in fluid communication with the third fluid chamber 308*c*.

The third fluid chamber 308*c* also defines a first subchamber 342 and a second subchamber 344. The first subchamber 342 is defined by a first subchamber wall 346, a second subchamber wall 348, a third subchamber wall 350 and the third intermediate wall 56. The first subchamber wall 346 and the third subchamber wall 350 are coupled to the second subchamber wall 348. The second subchamber wall 348 generally extends to enclose the first subchamber 342 and the second subchamber 344. The second subchamber wall 348 also defines a third fluid passageway 352 and a fourth fluid passageway 354. The third fluid passageway 352 enables fluid communication between the first subchamber 342 and the third fluid chamber 308*c*, based on a position of a second valve 356. The fourth fluid passageway 354 enables fluid communication between the second subchamber 344 and the third fluid chamber 308*c*, based on a position of a third valve 358. The second subchamber 344 is defined by the third subchamber wall 350, the second subchamber wall 348, a fourth subchamber wall 359 and the third intermediate wall 56. The fourth subchamber wall 359 is coupled to the second subchamber wall 348.

The second valve 356 is coupled between the first subchamber 342 and the third fluid chamber 308*c*. The second valve 356 comprises any suitable electromechanical valve known to one skilled in the art, which is movable to enable or disable fluid communication between the first subchamber 342 and the third fluid chamber 308*c*. In one example, the second valve 356 comprises a shut-off valve, such as a solenoid based shut-off valve. The second valve 356 is responsive to one or more control signals and/or an electric current to move between an opened positon to enable fluid flow or a closed position to prevent fluid flow. In the closed position, the first stability augmentation actuator 162, the first stability output shaft 164 and the one or more centering springs 166 of the stability augmentation system 26 are fluidly or hydraulically isolated from the third fluid chamber 308*c*, thereby preventing an adjustment in the flight output system 28 based on the first stability augmentation actuator 162. This may be beneficial if an issue or event occurs with the first stability augmentation actuator 162. In the opened position, the first stability augmentation actuator 162, the first stability output shaft 164 and the one or more centering springs 166 of the stability augmentation system 26 are in fluid communication with the third fluid chamber 308*c*, such that a movement of the first stability output shaft 164 causes a movement of the flight output system 28. It should be noted that although the stability augmentation system 26 is illustrated in FIG. 6 as including the one or more first centering springs 166, the one or more first centering springs 166 need not be included with the automatic flight servo system 300, if desired.

The third valve 358 is coupled between the second subchamber 344 and the third fluid chamber 308*c*. The third valve 358 comprises any suitable electromechanical valve known to one skilled in the art, which is movable to enable or disable fluid communication between the second subchamber 344 and the third fluid chamber 308*c*. In one example, the third valve 358 comprises a shut-off valve, such as a solenoid based shut-off valve. The third valve 358 is responsive to one or more control signals and/or an electric current to move between an opened positon to enable fluid flow or a closed position to prevent fluid flow. In the closed position, the second stability augmentation actuator 168, the second stability output shaft 170 and the one or more second centering springs 172 of the stability augmentation system 26 are fluidly or hydraulically isolated from the third fluid chamber 308*c*, thereby preventing an adjustment in the flight output system 28 based on the second stability augmentation actuator 168. This may be beneficial if an issue or event occurs with the second stability augmentation actuator 168. In the opened position, the second stability augmentation actuator 168, the second stability output shaft 170 and the one or more second centering springs 172 of the stability augmentation system 26 are in fluid communication with the third fluid chamber 308*c*, such that a movement of the second stability output shaft 170 causes a movement of the flight output system 28. It should be noted that although the stability augmentation system 26 is illustrated in FIG. 6 as including the one or more second centering springs 172, the one or more second centering springs 172 need not be included with the automatic flight servo system 300, if desired.

The fourth fluid chamber 32*d* is defined along the fourth side 42 of the housing 30 and the fourth intermediate side 58 of the intermediate support portion 44, and is further defined by the fifth wall 336. The sixth bore 340 is in fluid communication with the fourth fluid chamber 32*d*, and the second opening 48*b* of the second side 38 of the housing 306 is in fluid communication with the fourth fluid chamber 32*d*.

The trim input system 303 maintains the position of a portion of the pilot input system 24, and also adjusts or re-centers the stability augmentation system 26. In one example, the trim input system 303 includes an actuator 360, the output shaft 106, the first feel spring assembly 108 and the second feel spring assembly 110. The actuator 360 comprises a linear actuator, which is not backdrivable. Generally, the actuator 360 is a lower bandwidth actuator, which has a higher stroke. The actuator 360 is responsive to one or more control signals or an electric current to move or translate the output shaft 106. Generally, when the first valve 312 is opened, the actuator 360 is responsive to one or more control signals and/or an electric current to move or translate the output shaft 106 into a centered position relative to the first bellows 34*a* and the third bellows 34*c* to thereby re-center the stick 112.

The pilot input system 24 includes the stick 112, and is responsive to input from the pilot of the aircraft 12 to control the flight surfaces 14 via the flight output system 28. The pilot input system 24 is also responsive to the flight output system 28 to generate output to the stick 112 based on input received from the flight output system 28. In one example, the pilot input system 24 includes the stick 112, which is coupled to the first control coupling 136, the second control coupling 138 and the pivot coupling 140.

The stability augmentation system 26 controls or adjusts the flight output system 28 independently of the pilot input system 24 to ensure stable movement of the swashplate 14*a*. In one example, the stability augmentation system 26 includes the first stability augmentation actuator 162, the first stability output shaft 164, the second stability augmentation actuator 168 and the second stability output shaft 170. In this embodiment, the stability augmentation system 26 does not require the use of the one or more first centering springs 166 and the one or more second centering springs 172 due to the second valve 352 and the third valve 354.

The flight output system 28 is coupled to the swashplate 14*a* to control the rotor blade 14*b* based on input received from the pilot input system 24 and/or the stability augmentation system 26. In this regard, the flight output system 28 is coupled to the pilot input system 24 via the third fluid chamber 308*c* and the fourth fluid chamber 32*d* such that the movement of the stick 112 results in a corresponding movement of the flight output system 28, and when one or both of the second valve 356 and the third valve 358 are opened, the movement of the first stability output shaft 164 and/or the second stability output shaft 170 also results in a corresponding movement of the flight output system 28. The ratio of the movement is varies based on whether the stability augmentation system 26 is fluidly or hydraulically coupled to the third fluid chamber 308*c*. In one example, the flight output system 28 includes the output linkage 182, the third control coupling 184, the fourth control coupling 186 and the second pivot coupling 188.

As the automatic flight servo system 300 is assembled in similar fashion as the automatic flight servo system 10, the assembly of the automatic flight servo system 300 will not be discussed in great detail herein. Briefly, however, the automatic flight servo system 300 is assembled once the manifold 302 formed through a suitable method, such as casting, milling, etc., the bellows 34*a*-34*l* are coupled to the respective openings or bores within the manifold 302. It should be noted that while the manifold 302 is illustrated herein as comprising a single integrally formed part, the manifold 302 may comprise a number of parts separately formed and coupled together through suitable techniques, such as welding, mechanical fasteners, etc. The hydraulic fluid may be introduced into the fluid chambers 308*a*-32*d*, the first subchamber 342 and second subchamber 344 once the fluid chambers 308*a*-32*d*, the first subchamber 342 and second subchamber 344 are defined. The first valve 312 is coupled between the first fluid passageway 324 and the second fluid passageway 334. The second valve 356 is coupled to the third fluid passageway 352, and the third valve 358 is coupled to the fourth fluid passageway 354.

With the automatic flight servo system 300 assembled, the automatic flight servo system 300 is coupled to the aircraft 12, and the first linkage end 190 of the output linkage 182 is coupled to the swashplate 14*a*, and the swashplate 14*a* is coupled to the rotor blade 14*b*. As the use of the automatic flight servo system 300 is substantially similar to the use of the automatic flight servo system 10, only the differences between the automatic flight servo system 300 and the automatic flight servo system 10 will be discussed herein. Briefly, the first valve 312 is responsive to one or more control signals to move between the opened position, to enable fluid communication between the first fluid chamber 308*a* and the second fluid chamber 308*b*. When the first valve 312 is in the opened position, the actuator 360 moves the output shaft 106 to a center position such that the output shaft 106 is centered relative to the first bellows 34*a* and the third bellows 34*c*. In the opened position, the first valve 312 enables the repositioning of the stick 112 to a new null, default or preset position. In the closed position, the first valve 312 fluidly or hydraulically isolates the first fluid chamber 308*a* from the second fluid chamber 308*b*, and thereby provides a stiff ground for moving the stick 112.

The second valve 356 and the third valve 358 fluidly or hydraulically couple the first subchamber 342 and the second subchamber 344, respectively, to the third fluid chamber 308*c*. With the second valve 356 and/or the third valve 358 in the opened position, the stability augmentation system 26 provides input to the flight output system 28 to adjust or augment the input to the output linkage 182. With the second valve 356 and/or the third valve 358 in the closed position, the stability augmentation system 26 is fluidly or hydraulically isolated from the third fluid chamber 308*c*, and thus, the input from the pilot input system 24 is transferred directly to the flight output system 28 in a one to one ratio.

Figure 7:
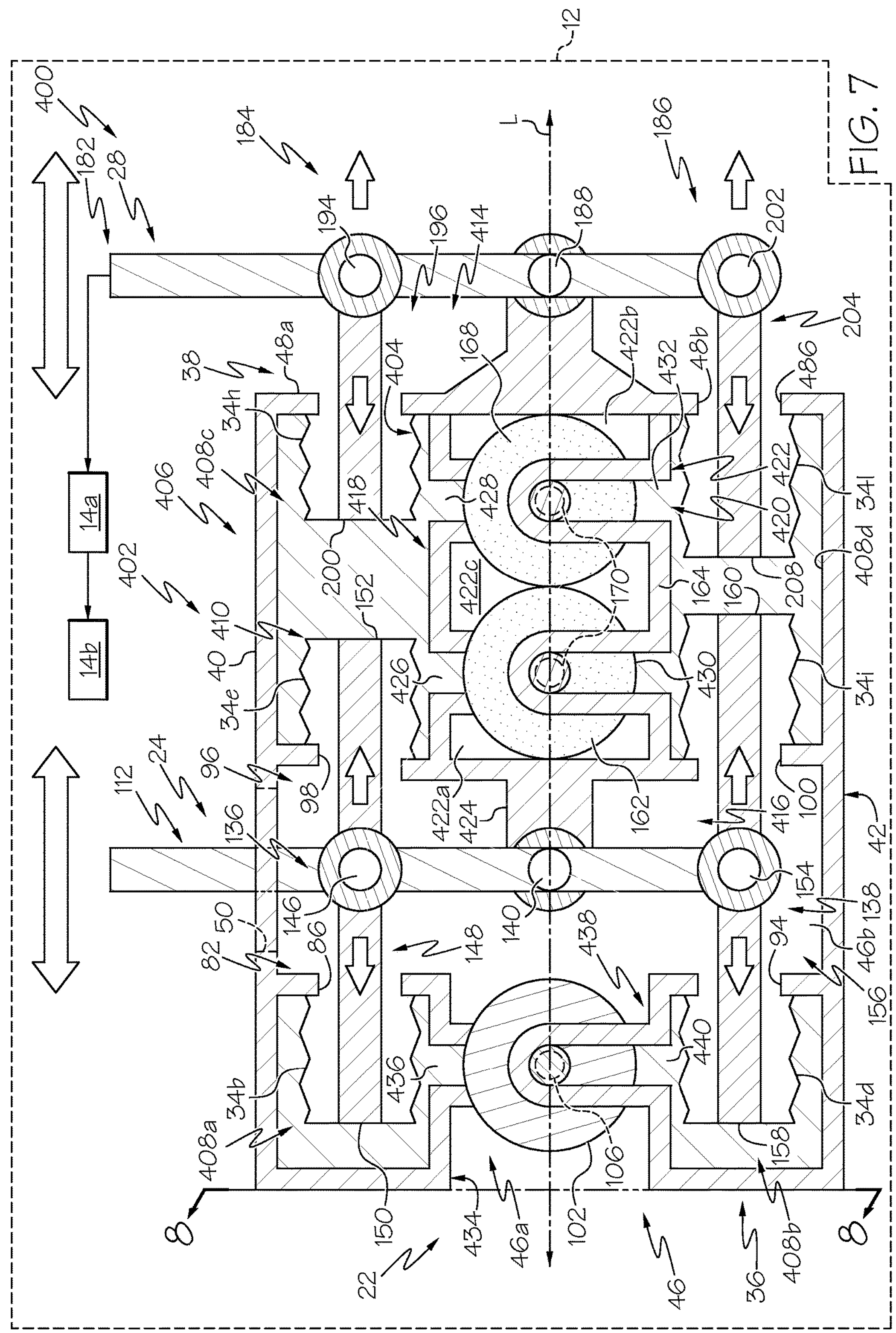
FIG. 7 is a schematic cross-sectional illustration of a compact hydrostatic automatic flight servo system in accordance with various embodiments.
Figure 8:
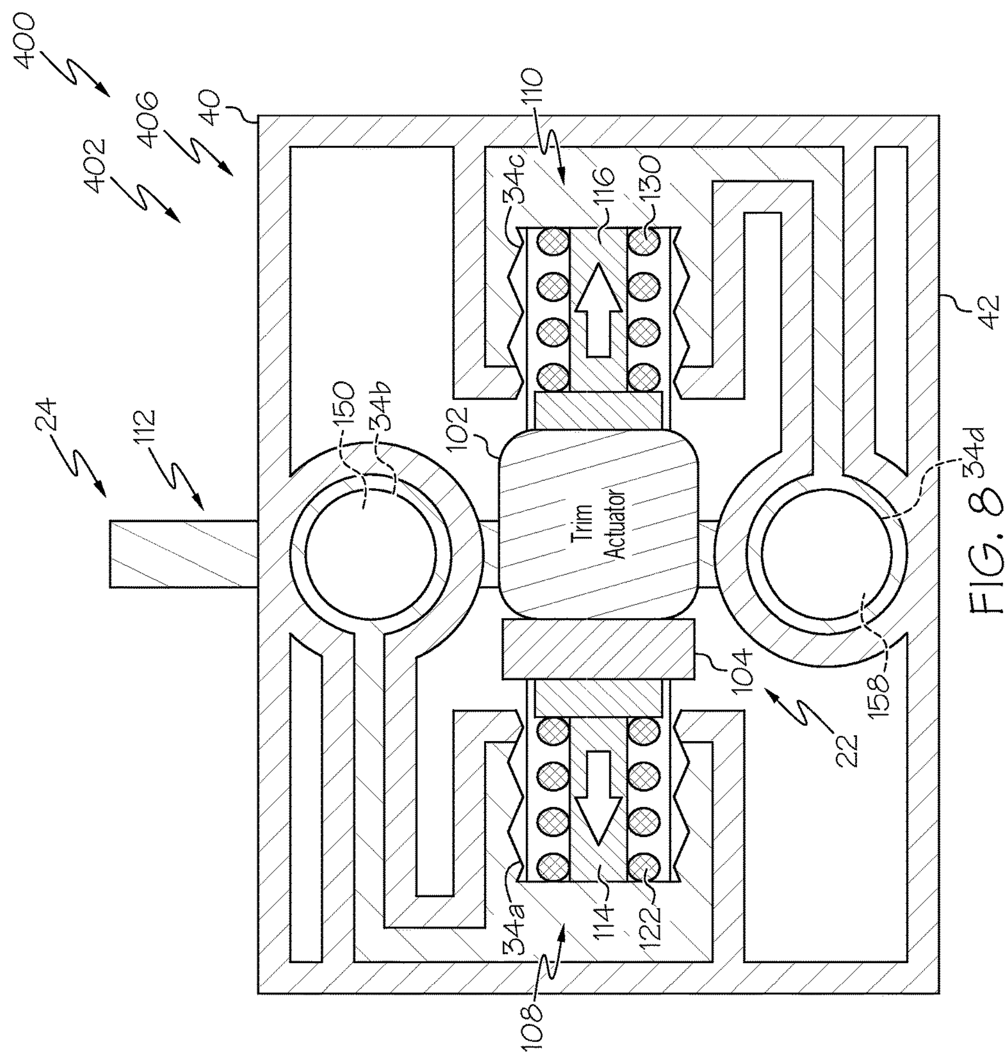
FIG. 8 is a schematic cross-sectional illustration of the compact hydrostatic automatic flight servo system of FIG. 7, taken along line 8-8 of FIG. 7, in accordance with various embodiments.

With reference now to FIGS. 7 and 8, a cross-sectional schematic illustration of a hydrostatic automatic flight servo system 400 is shown. As the automatic flight servo system 400 can be similar to the automatic flight servo system 10 discussed with regard to FIGS. 1-5, only the differences between the automatic flight servo system 10 and the automatic flight servo system 400 will be discussed in detail herein, with the same reference numerals used to denote the same or substantially similar components. The automatic flight servo system 400 can be employed with the aircraft 12 to provide output to the swashplate 14*a* for controlling the operation or movement of the rotor blade 14*b*. The automatic flight servo system 400 includes a manifold 402, the trim input system 22, the pilot input system 24, the stability augmentation system 26 and the flight output system 28. The shape and configuration of the manifold 402 provides for a compact design of the automatic flight servo system 400.

The manifold 402 comprises a housing 406 that defines one or more fluid chambers 408 and includes the one or more compressible members or bellows 34. The one or more fluid chambers 408 and the one or more bellows 34 are configured to cooperate with the trim input system 22, the pilot input system 24, the stability augmentation system 26 and the flight output system 28. With reference to FIG. 7, the housing 406 comprises any desired shape to substantially enclose the one or more fluid chambers 408 and the one or more bellows 34. In one example, the housing 406 is substantially rectangular and extends along a longitudinal axis L, however, it will be understood that the housing 406 can have any desired shape. The housing 406 is comprised of any suitable material, and in one example, the housing 406 comprises a metal or a metal alloy. It should be noted that the housing 406 can comprise a suitable fiber reinforced polymeric material if desired. The housing 406 defines the first side 36, the second side 38, a third side 412, the fourth side 42 and includes an intermediate support portion 414.

The first side 36 is generally opposite the second side 38. The first side 36 extends generally transverse to the longitudinal axis L, and defines the recessed portion 46 for receipt of a portion of the trim input system 22 and a portion of the pilot input system 24. The second side 38 defines the first opening 48*a* and the second opening 48*b*. The first opening 48*a* and the second opening 48*b* are sized to enable a portion of the flight output system 28 to be received within and move relative to the first opening 48*a* and the second opening 48*b*. The third side 40 is defined between the first side 36 and the second side 38, and is substantially opposite the fourth side 42. The third side 40 defines the slot 50, which is sized and configured to enable the stick 112 of the pilot input system 24 to pass therethrough and to move relative to the manifold 402. The fourth side 42 is defined between the first side 36 and the second side 38.

The intermediate support portion 414 is defined between the third side 40 and the fourth side 42, and extends from the second side 38 towards the first side 36, such that the intermediate support portion 414 terminates at the second branch 46*b*. The intermediate support portion 414 is generally formed along the second side 38 so as to extend between the first opening 48*a* and the second opening 48*b*. In one example, the intermediate support portion 414 includes a first intermediate side 416, the second intermediate side 54, a third intermediate side 418, a fourth intermediate side 420 and one or more cavities 422.

The first intermediate side 416 is generally opposite the second intermediate side 54. The first intermediate side 416 includes a first support arm 424. The first support arm 424 extends outwardly from the first intermediate side 416 along the longitudinal axis L of the housing 406. The first support arm 424 is coupled to the pivot coupling 140 of the pilot input system 24. The second intermediate side 54 includes the second support arm 64.

The third intermediate side 418 extends between the first intermediate side 416 and the second intermediate side 54. In one example, the third intermediate side 418 defines a first channel 426 and a second channel 428. The first channel 426 and the second channel 428 are defined through the third intermediate side 418 to fluidly or hydraulically couple the stability augmentation system 26 to one of the fluid chambers 408. In one example, the first channel 426 and the second channel 428 are defined through the third intermediate side 418 so as to be spaced apart by a predefined distance.

The fourth intermediate side 420 extends between the first intermediate side 416 and the second intermediate side 54. In one example, the fourth intermediate side 420 defines a third channel 430 and a fourth channel 432. The third channel 430 and the fourth channel 432 are defined through the fourth intermediate side 420 to fluidly or hydraulically couple the stability augmentation system 26 to one of the fluid chambers 408. In one example, the third channel 430 and the fourth channel 432 are defined through the fourth intermediate side 420 so as to be spaced apart by a predefined distance. Generally, the third channel 430 and the fourth channel 432 are defined through the fourth intermediate side 420 such that the third channel 430 and the fourth channel 432 are substantially coaxial with the first channel 426 and the second channel 428 of the third intermediate side 418.

The one or more cavities 422 are defined between the third intermediate side 418 and the fourth intermediate side 420. In one example, the one or more cavities 422 comprise a first cavity 422*a*, a second cavity 422*b* and a third cavity 422*c*. Generally, the first stability augmentation actuator 162 is received between the first cavity 422*a* and the third cavity 422*c* such that the first stability output shaft 164 is in fluid communication with the first channel 426 and third channel 430. The second stability augmentation actuator 168 is received between the second cavity 422*b* and the third cavity 422*c* such that the second stability output shaft 170 is in fluid communication with the second channel 428 and fourth channel 432.

With continued reference to FIG. 7, the housing 406 defines the one or more fluid chambers 408. In one example, the one or more fluid chambers 408 comprise a first fluid chamber 408*a*, a second fluid chamber 408*b*, a third fluid chamber 408*c* and a fourth fluid chamber 408*d*. It will be understood, however, that the number and arrangement of the one or more fluid chambers 408 is merely exemplary, and the manifold 402 may include any number and arrangement of fluid chambers 408. In this example, the first fluid chamber 408*a* is defined generally opposite the second fluid chamber 408*b* about the longitudinal axis L, and the third fluid chamber 408*c* is defined generally opposite the fourth fluid chamber 408*d* about the longitudinal axis L. Each of the first fluid chamber 408*a*, the second fluid chamber 408*b*, the third fluid chamber 408*c* and the fourth fluid chamber 408*d* are fluidly or hydraulically isolated from each other. In addition, each of the first fluid chamber 408*a*, the second fluid chamber 408*b*, the third fluid chamber 408*c* and the fourth fluid chamber 408*d* contain a hydraulic fluid. As is generally known in the art, a "hydrostatic fluid" is a fluid that is incompressible and static. The first fluid chamber 408*a*, the second fluid chamber 408*b*, the third fluid chamber 408*c* and the fourth fluid chamber 408*d* comprise any suitable hydraulic fluid, for example, a suitable aeronautical hydraulic fluid as known to one of ordinary skill in the art.

The first fluid chamber 408*a* is defined along the first side 36 and the third side 40 of the housing 406, and is further defined by a first wall 434 and the second wall 82 of the housing 406. The first wall 434 defines an opening or channel 436, and the second wall 82 defines the second bore 86. The channel 436 is sized and configured to receive a portion of the output shaft 106 of the trim input system 22, and the second bore 86 is sized and configured to receive the first control arm 148 of the pilot input system 24.

The second fluid chamber 408*b* is defined along the first side 36 and the fourth side 42 of the housing 406, and is further defined by a third wall 438 and the fourth wall 90 of the housing 406. The third wall 438 defines an opening or third channel 440, and the fourth wall 90 defines the fourth bore 94. The third channel 440 is sized and configured to receive a portion of the output shaft 106 of the trim input system 22, and the fourth bore 94 is sized and configured to receive the second control arm 156 of the pilot input system 24.

The third fluid chamber 408*c* is defined along the third side 40 of the housing 406 and the third intermediate side 418 of the intermediate support portion 414, and is further defined by the fifth wall 96 and the second side 38 of the housing 406. The fifth wall 96 defines the fifth bore 98 and the sixth bore 100. The fourth fluid chamber 408*d* is defined along the fourth side 42 of the housing 406 and the fourth intermediate side 420 of the intermediate support portion 414, and is further defined by the fifth wall 96 and the second side 38 of the housing 406. The sixth bore 100 is in fluid communication with the fourth fluid chamber 408*d*, and the second opening 48*b* of the second side 38 of the housing 406 is in fluid communication with the fourth fluid chamber 408*d*.

The one or more bellows 34 cooperate with the various bores and openings associated with the housing 406. Each of the bellows 34 are coupled to the respective one of the openings and/or bores such that the respective bellows 34 forms a leak-proof seal about the respective one of the openings and/or bores and such that the bellows 34 are movable relative the respective openings and/or bores based on the displacement of fluid within the fluid chambers 408*a*-408*d*. The trim input system 22 maintains the position of a portion of the pilot input system 24, and also adjusts or re-centers the stability augmentation system 26. In one example, with reference to FIG. 8, the trim input system 22 includes the actuator 102, the brake 104, the output shaft 106, the first feel spring assembly 108 and the second feel spring assembly 110.

With reference to FIG. 7, the pilot input system 24 includes the stick 112, and is responsive to input from the pilot of the aircraft 12 to control the flight surfaces 14 via the flight output system 28. The pilot input system 24 is also responsive to the flight output system 28 to generate output to the stick 112 based on input received from the flight output system 28. In one example, the pilot input system 24 includes the stick 112, which is coupled to the first control coupling 136, the second control coupling 138 and the pivot coupling 140.

The stability augmentation system 26 controls or adjusts the flight output system 28 independently of the pilot input system 24 to ensure stable movement of the swashplate 14*a*. In one example, the stability augmentation system 26 includes the first stability augmentation actuator 162, the first stability output shaft 164, the one or more first centering springs 166, the second stability augmentation actuator 168, the second stability output shaft 170 and the one or more second centering springs 172.

The flight output system 28 is coupled to the swashplate 14*a* to control the rotor blade 14*b* based on input received from the pilot input system 24 and/or the stability augmentation system 26. In this regard, the flight output system 28 is coupled to the pilot input system 24 via the third fluid chamber 408*c* and the fourth fluid chamber 408*d* such that the movement of the stick 112 results in a corresponding movement of the flight output system 28, and the stability augmentation system 26 is coupled to the third fluid chamber 408*c* and the fourth fluid chamber 408*d* such that movement of the first stability output shaft 164 and/or the second stability output shaft 170 also results in a corresponding movement of the flight output system 28. The flight output system 28 includes the output linkage 182, the third control coupling 184, the fourth control coupling 186 and the second pivot coupling 188.

As the automatic flight servo system 400 is assembled in similar fashion as the automatic flight servo system 10, the assembly of the automatic flight servo system 400 will not be discussed in detail herein. Briefly, however, the automatic flight servo system 400 is assembled once the manifold 402 formed through a suitable method, such as casting, milling, etc., the bellows 34 are coupled to the respective openings or bores within the manifold 402. It should be noted that while the manifold 402 is illustrated herein as comprising a single integrally formed part, the manifold 402 may comprise a number of parts separately formed and coupled together through suitable techniques, such as welding, mechanical fasteners, etc. The hydraulic fluid may be introduced into the fluid chambers 408*a*-408*d*, once the fluid chambers 408*a*-408*d* are defined.

As the use of the automatic flight servo system 400 is substantially similar to the use of the automatic flight servo system 10, the operation of the automatic flight servo system 400 will not be discussed in great detail herein as one of ordinary skill in the art would understand the operation of the automatic flight servo system 400 based on the description regarding the operation of the automatic flight servo system 10.

Figure 9:
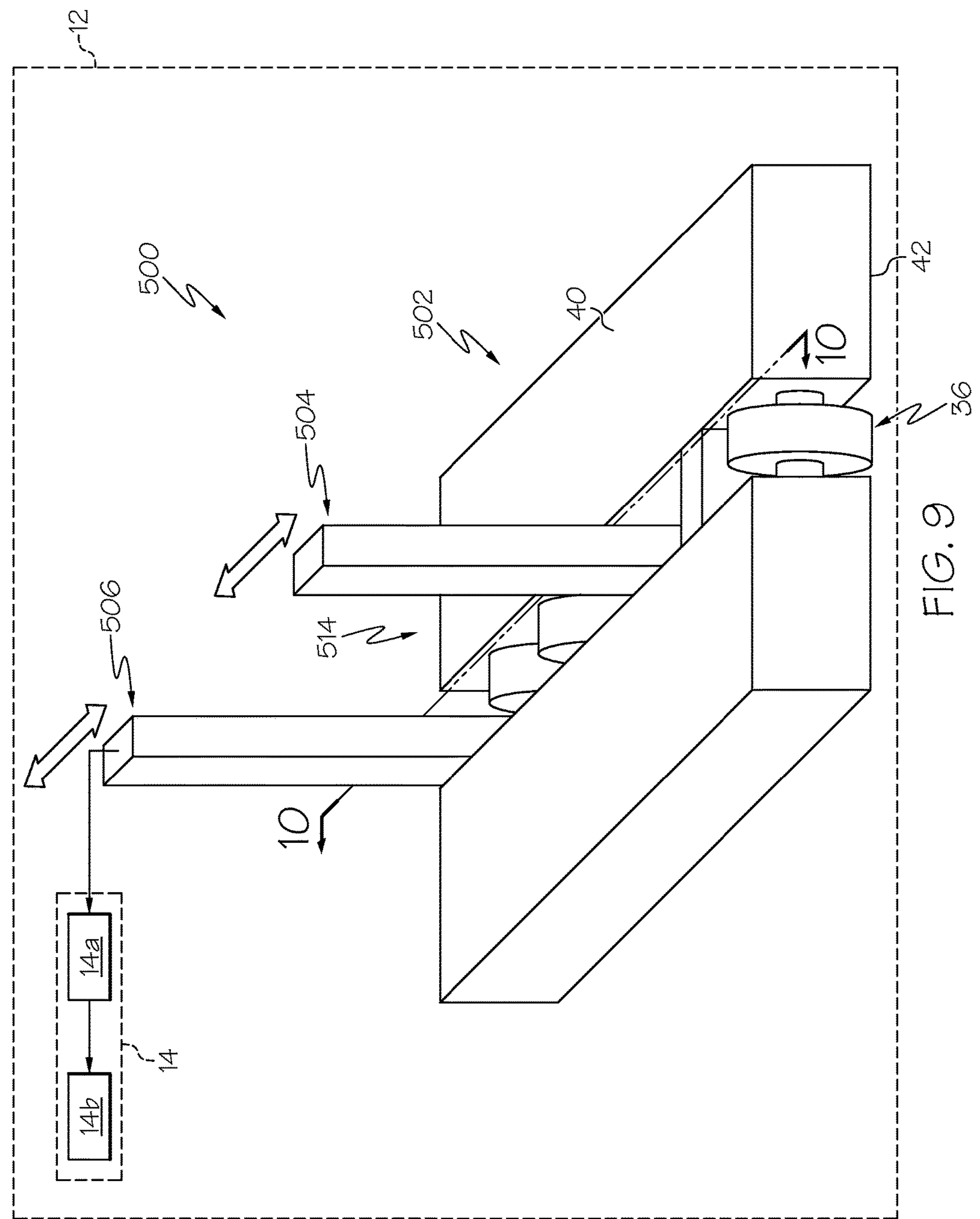
FIG. 9 is a schematic perspective illustration of a compact hydrostatic automatic flight servo system in accordance with various embodiments.
Figure 10:
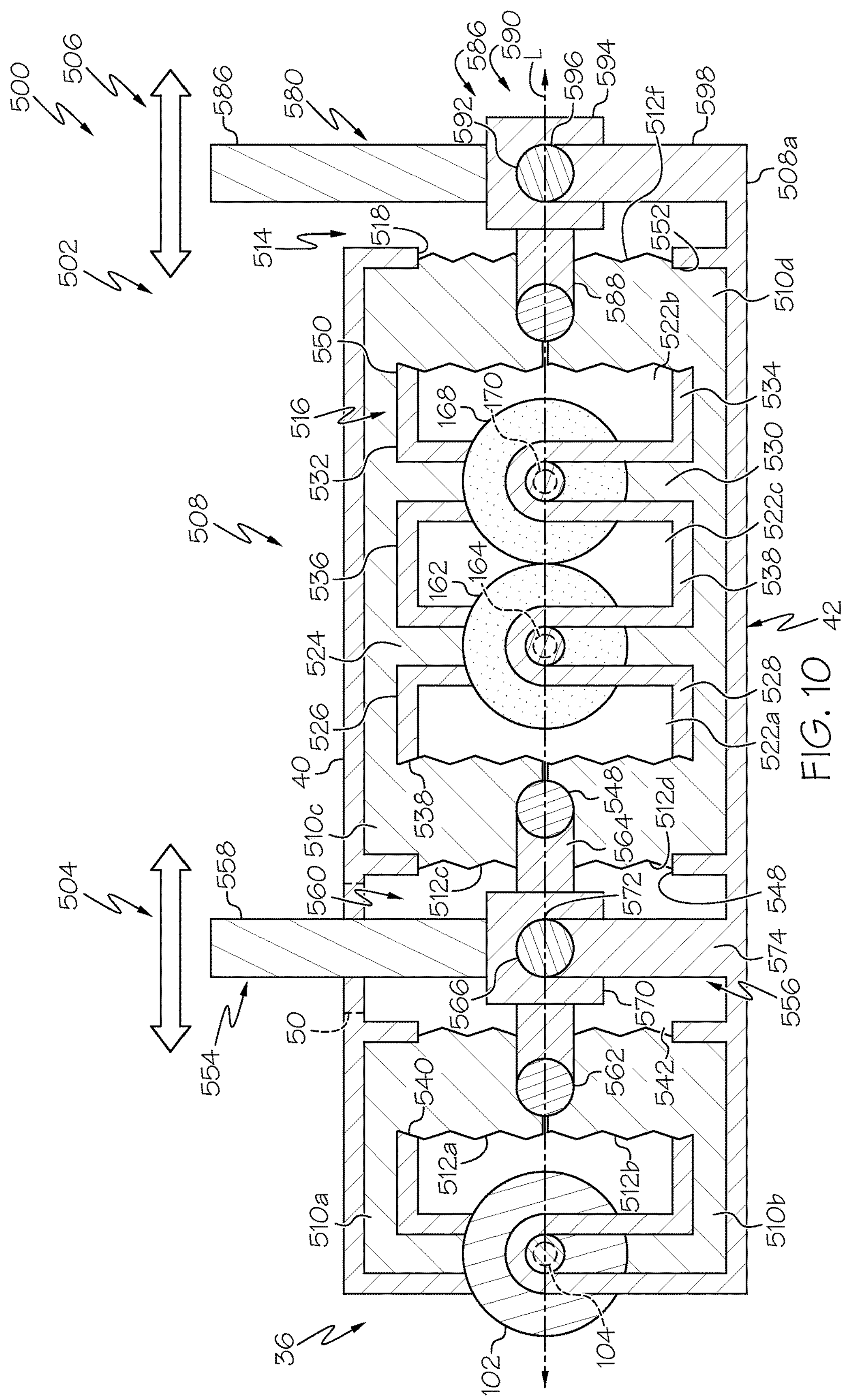
FIG. 10 is a schematic cross-sectional illustration of the compact hydrostatic automatic flight servo system of FIG. 9, taken along line 10-10 of FIG. 9, illustrating the compact hydrostatic automatic flight servo system in a first position in accordance with various embodiments.

With reference now to FIGS. 9 and 10, a cross-sectional schematic illustration of a hydrostatic automatic flight servo system 500 is shown. As the automatic flight servo system 500 can be similar to the automatic flight servo system 10 discussed with regard to FIGS. 1-5, only the differences between the automatic flight servo system 10 and the automatic flight servo system 500 will be discussed in detail herein, with the same reference numerals used to denote the same or substantially similar components. The automatic flight servo system 500 can be employed with the aircraft 12 to control the flight surfaces 14. With reference to FIGS. 9 and 10, the automatic flight servo system 500 provides output to the swashplate 14*a* for controlling the operation or movement of the rotor blade 14*b*. The automatic flight servo system 500 includes a manifold 502, the trim input system 22, a pilot input system 504, the stability augmentation system 26 and a flight output system 506. The shape and configuration of the manifold 502 provides for a compact design of the automatic flight servo system 500.

With reference to FIG. 10, the manifold 502 comprises a housing 508 that defines one or more fluid chambers 510 and includes one or more compressible members or bellows 512. As will be discussed, the one or more fluid chambers 510 and the one or more bellows 512 are configured to cooperate with the trim input system 22, the pilot input system 504, the stability augmentation system 26 and the flight output system 506. The housing 508 comprises any desired shape to substantially enclose the one or more fluid chambers 510 and the one or more bellows 512. In one example, the housing 508 is substantially rectangular and extends along a longitudinal axis L, however, it will be understood that the housing 508 can have any desired shape. The housing 508 is comprised of any suitable material, and in one example, the housing 508 comprises a metal or a metal alloy. It should be noted that the housing 508 can comprise a suitable fiber reinforced polymeric material if desired. The housing 508 defines the first side 36, a second side 514, the third side 40, the fourth side 42 and includes an intermediate support portion 516.

The first side 36 is generally opposite the second side 514. The second side 514 extends generally transverse to the longitudinal axis L. The second side 514 defines an opening 518. In one example, the opening 518 is substantially symmetric about the longitudinal axis L. The opening 518 is sized to enable a portion of the flight output system 28 to be received within and move relative to the opening 518 and to receive one or more of the bellows 412.

The third side 40 is defined between the first side 36 and the second side 514, and is substantially opposite the fourth side 42. The third side 40 defines the slot 50, which is sized and configured to enable a portion of the pilot input system 504 to pass therethrough and to enable a portion of the pilot input system 504 to be movable relative to the manifold 502. The fourth side 42 is defined between the first side 36 and the second side 514, and is substantially planar.

The intermediate support portion 516 is defined between the third side 40 and the fourth side 42. The intermediate support portion 516 defines one or more cavities 522. In one example, the intermediate support portion 516 defines a first cavity 522*a*, a second cavity 522*b* and a third cavity 522*c*. The first cavity 522*a* is spaced apart from the third cavity 522*c* so as to define a fluid passageway 524 between the first cavity 522*a* and the third cavity 522*c*. The first cavity 522*a* is bounded by a first wall 526, a second wall 528 and one or more of the bellows 512. The second cavity 522*b* is spaced apart from the third cavity 522*c* so as to define a second fluid passageway 530 between the second cavity 522*b* and the third cavity 522*c*. The second cavity 522*b* is bounded by a third wall 532, a fourth wall 534 and one or more of the bellows 512. The third cavity 522*c* is defined by a U-shaped wall 536 and a second U-shaped wall 538. Generally, the first stability augmentation actuator 162 is received between the first cavity 522*a* and the third cavity 522*c* so that the first stability output shaft 164 is in fluid communication with the fluid passageway 524, and the second stability augmentation actuator 168 is received between the second cavity 522*b* and the third cavity 522*c* so that the second stability output shaft 170 is in fluid communication with the second fluid passageway 530.

With continued reference to FIG. 10, the housing 508 defines the one or more fluid chambers 510. In one example, the one or more fluid chambers 510 comprise a first fluid chamber 510*a*, a second fluid chamber 510*b*, a third fluid chamber 510*c* and a fourth fluid chamber 510*d*. It will be understood, however, that the number and arrangement of the one or more fluid chambers 510 is merely exemplary, and the manifold 502 may include any number and arrangement of fluid chambers 510. In this example, the first fluid chamber 510*a* is defined generally opposite the second fluid chamber 510*b* about the longitudinal axis L, and the third fluid chamber 510*c* is defined generally opposite the fourth fluid chamber 510*d* about the longitudinal axis L. Each of the first fluid chamber 510*a*, the second fluid chamber 510*b*, the third fluid chamber 510*c* and the fourth fluid chamber 510*d* are fluidly or hydraulically isolated from each other. In addition, each of the first fluid chamber 510*a*, the second fluid chamber 510*b*, the third fluid chamber 510*c* and the fourth fluid chamber 510*d* contain a hydraulic fluid. As is generally known in the art, a "hydrostatic fluid" is a fluid that is incompressible and static. The first fluid chamber 510*a*, the second fluid chamber 510*b*, the third fluid chamber 510*c* and the fourth fluid chamber 510*d* comprise any suitable hydraulic fluid, for example, a suitable aeronautical hydraulic fluid as known to one of ordinary skill in the art.

The first fluid chamber 510*a* is defined along the first side 36 and the third side 40 of the housing 508, and is further defined by the trim input system 22 and the one or more bellows 512. The second fluid chamber 510*b* is defined along the first side 36 and the fourth side 42 of the housing 508, and is further defined by the trim input system 22 and the one or more bellows 512. The third fluid chamber 510*c* is defined along the third side 40 of the housing 30, and is further defined by the intermediate support portion 516 and the one or more bellows 512. The fourth fluid chamber 510*d* is defined along the fourth side 42 of the housing 508, and is further defined by the intermediate support portion 516 and the one or more bellows 512.

The one or more bellows 512 cooperate with the one or more fluid chambers 510 of the housing 508. In one example, the housing 508 includes six bellows: a first bellows 512*a*, a second bellows 512*b*, a third bellows 512*c*, a fourth bellows 512*d*, a fifth bellows 512*e* and a sixth bellows 512*f*. The housing 508 can also include additional bellows, such as the bellows 34*a*, 34*c*, 34*f*, 34*g*, 34*j* and 34*k* associated with the trim input system 22 and the stability augmentation system 26 as described with regard to FIGS. 1-5, which are omitted herein for clarity. Each of the bellows 512*a*-512*f* comprise metallic bellows; however, the bellows 512*a*-512*f* may be composed of any suitable material. Generally, the bellows 512*a*-512*f* are composed of a material with sufficient rigidity to sustain the fluid pressure levels associated with the fluid within the respective one of the fluid chambers 510*a*-510*d*, but with sufficient flexibility to enable the movement of the bellows 512*a*-512*f* for a predefined stroke upon receipt of input from the trim input system 22, the pilot input system 504, the stability augmentation system 26, and the flight output system 506. Each of the bellows 512*a*-512*f* are coupled to a respective one of the bores or openings through any suitable technique, such as welding, mechanical fasteners with seals, etc., and moreover, one or more of the bellows 512*a*-512*f* may be defined in the manifold 502 via stamping, such that the bellows 512*a*-512*f* may be integrally formed with the manifold 502, if desired.

Each of the bellows 512*a*-512*f* are coupled to the housing 508 to form a leak-proof seal. Generally, each of the bellows 512*a*-512*f* are coupled to the housing 508 so as to be movable within the respective fluid chamber 510 associated with the housing 508. In one example, the first bellows 512*a* is coupled about a bore 540 to prevent the ingress and egress of fluid from the first fluid chamber 510*a* and so as to be movable relative to the bore 540 by the fluid contained in the first fluid chamber 510*a*. The second bellows 512*b* is coupled about a second bore 542 also to prevent the ingress and egress of fluid from the second fluid chamber 510*b* and so as to be movable relative to the second bore 542 by the fluid contained in the second fluid chamber 510*b*. The third bellows 512*c* is coupled about a third bore 546 to prevent the ingress and egress of fluid from the third fluid chamber 510*c* and so as to be movable relative to the third bore 546 by the fluid contained in the third fluid chamber 510*c*. The fourth bellows 512*d* is coupled about a fourth bore 548 to prevent the ingress and egress of fluid from the fourth fluid chamber 510*d* and so as to be movable relative to the fourth bore 548 by the fluid contained in the fourth fluid chamber 510*d*. The fifth bellows 512*e* is coupled about a fifth bore 550 to prevent the ingress and egress of fluid from the third fluid chamber 510*c* and so as to be movable relative to the fifth bore 550 by the fluid contained in the third fluid chamber 510*c*. The sixth bellows 512*f* is coupled about a sixth bore 552 to prevent the ingress and egress of fluid from the fourth fluid chamber 510*d* and so as to be movable relative to the sixth bore 552 by the fluid contained in the fourth fluid chamber 510*d*. Each of the bellows 512*a*-512*f* are also coupled to a portion of a respective one of the trim input system 22, the pilot input system 504, the stability augmentation system 26 and the flight output system 506, as will be discussed further herein.

The trim input system 22 maintains the position of a portion of the pilot input system 24, and also adjusts or re-centers the stability augmentation system 26. In one example, the trim input system 22 includes the actuator 102, the brake 104, the output shaft 106, the first feel spring assembly 108 and the second feel spring assembly 110.

The pilot input system 504 includes a stick 554, and is responsive to input from the pilot of the aircraft 12 to control the flight surfaces 14 via the flight output system 506. The pilot input system 504 is also responsive to the flight output system 506 to generate output to the stick 554 based on input received from the flight output system 506. In one example, the pilot input system 504 includes the stick 554, which is coupled to a pivot coupling 556.

The stick 554 comprises any suitable input device for receiving input from the pilot of the aircraft 12 (FIG. 9). In one example, the stick 554 is substantially rectangular, however, the stick 554 can have any desired shape. While not illustrated herein as including a grip surface, the stick 554 may also include one or more surfaces to facilitate the manipulation of the stick 554. The stick 554 generally extends along an axis, which is transverse to the longitudinal axis L. The stick 554 is movable by the pilot within the slot 50 at a plurality of positions, each generally transverse to the longitudinal axis L. The stick 554 has a first stick end 558 and a second stick end 560. The first stick end 558 is positioned outside of the manifold 502, and for example, extends into a cockpit associated with the aircraft 12, to receive the input from the pilot. The second stick end 560 is coupled to the pivot coupling 556 and is received within the manifold 502. The second stick end 560 also includes a first control arm 562 and a second control arm 564, which each extend outwardly from a flange 566.

The first control arm 562 is coupled to the flange 566, and is fixedly coupled to the first bellows 512*a* and the second bellows 512*b*. The first control arm 562 is coupled to the first bellows 512*a* and the second bellows 512*b* such that the movement or pivoting of the stick 554 results in an expansion or compression of a respective one of the first bellows 512*a* and the second bellows 512*b*. In one example, the first control arm 562 is welded to the respective one of the first bellows 512*a* and the second bellows 512*b*, however, the first control arm 562 may be fixedly coupled to first bellows 512*a* and the second bellows 512*b* through any suitable technique, such as the use of one or more mechanical fasteners, for example, pins.

The second control arm 564 is coupled to the flange 566, and is fixedly coupled to the third bellows 512*c* and the fourth bellows 512*d*. The second control arm 564 is coupled to the third bellows 512*c* and the fourth bellows 512*d* such that the movement or pivoting of the stick 554 results in an expansion or compression of a respective one of the third bellows 512*c* and the fourth bellows 512*d*. In one example, the second control arm 564 is welded to the respective one of the third bellows 512*c* and the fourth bellows 512*d*, however, the second control arm 564 may be fixedly coupled to the third bellows 512*c* and the fourth bellows 512*d* through any suitable technique, such as the use of one or more mechanical fasteners, for example, pins.

The flange 566 is coupled to the second stick end 560, the first control arm 562, the second control arm 564 and defines a pivot surface 568. The pivot surface 568 enables the stick 554 to move relative to the pivot coupling 556 within the slot 50. In one example, the pivot surface 568 includes an overhang 570 to retain the stick 554 on the pivot coupling 556. The pivot coupling 556 enables the stick 554 to move or pivot within the housing 508. In one example, the pivot coupling 556 includes a rotational surface 572 and an arm 574. The rotational surface 572 is sized and shaped to be received within the pivot surface 568 to enable the stick 554 to move or pivot relative to the pivot coupling 556. The arm 574 couples the pivot coupling 556 to the housing 508.

The stability augmentation system 26 controls or adjusts the flight output system 506 independently of the pilot input system 504 to ensure stable movement of the swashplate 14*a*. In one example, the stability augmentation system 26 includes the first stability augmentation actuator 162, the first stability output shaft 164, the one or more first centering springs 166, the second stability augmentation actuator 168, the second stability output shaft 170 and the one or more second centering springs 172.

The flight output system 506 is coupled to the swashplate 14*a* to control the rotor blade 14*b* (FIG. 9) based on input received from the pilot input system 504 and/or the stability augmentation system 26. In this regard, the flight output system 506 is coupled to the pilot input system 504 via the third fluid chamber 510*c* and the fourth fluid chamber 510*d* such that the movement of the stick 554 results in a corresponding movement of the flight output system 506, and the stability augmentation system 26 is coupled to the third fluid chamber 510*c* and the fourth fluid chamber 510*d* such that movement of the first stability output shaft 164 and/or the second stability output shaft 170 also results in a corresponding movement of the flight output system 506. The ratio of the movement varies based on the stability augmentation system 26. In one example, the flight output system 506 includes an output linkage 580, which is coupled to a second pivot coupling 582.

The output linkage 580 comprises any suitable output linkage that is able to be coupled to the swashplate 14*a* (FIG. 9). In one example, the output linkage 580 is substantially rectangular, however, the output linkage 580 can have any desired shape. While not illustrated herein as including a coupling surface or coupling interface, the output linkage 580 may also include one or more surfaces or features, such as bores, to facilitate coupling the output linkage 580 to the swashplate 14*a*. With reference to FIG. 10, the output linkage 580 generally extends along an axis, which is transverse to the longitudinal axis L. The output linkage 580 is movable by the pilot input system 504 between a plurality of positions relative to the manifold 502, each generally transverse to the longitudinal axis L. Generally, the output linkage 580 extends outside of the manifold 502 and is movable relative to the manifold 502. The output linkage 580 has a first linkage end 584 and a second linkage end 586. The first linkage end 584 is positioned outside of the manifold 502 and is able to be coupled to the swashplate 14*a* to provide input to the swashplate 14*a*. The first linkage end 584 may be coupled to the swashplate 14*a* through any suitable technique known to one skilled in the art, such as mechanical fasteners, etc. The second linkage end 586 is coupled to the second pivot coupling 582. The second linkage end 586 also includes a third control arm 588, which extends outwardly from a flange 590.

The third control arm 588 is coupled to the flange 590, and is fixedly coupled to the fifth bellows 512*e* and the sixth bellows 512*f*. The third control arm 588 is coupled to the fifth bellows 512*e* and the sixth bellows 512*f* such that the movement or pivoting of the output linkage 580 results in an expansion or compression of a respective one of the fifth bellows 512*e* and the sixth bellows 512*f*. In one example, the third control arm 588 is welded to the respective one of the fifth bellows 512*e* and the sixth bellows 512*f*, however, the third control arm 588 may be fixedly coupled to fifth bellows 512*e* and the sixth bellows 512*f* through any suitable technique, such as the use of one or more mechanical fasteners, for example, pins.

The flange 590 is coupled to the second linkage end 586, third control arm 588 and defines a pivot surface 592. The pivot surface 592 enables the output linkage 580 to move relative to the second pivot coupling 582. In one example, the pivot surface 592 includes an overhang 594 to retain the output linkage 580 on the second pivot coupling 582. The second pivot coupling 582 enables the output linkage 580 to move or pivot relative to the housing 508. In one example, the second pivot coupling 582 includes a rotational surface 596 and an arm 598. The rotational surface 596 is sized and shaped to be received within the pivot surface 592 to enable the output linkage 580 to move or pivot relative to the second pivot coupling 582. The arm 598 couples the pivot coupling 556 to an extension 508*a* of the housing 508.

As the automatic flight servo system 500 is assembled in similar fashion as the automatic flight servo system 10, the assembly of the automatic flight servo system 500 will not be discussed in detail herein. Briefly, however, the automatic flight servo system 500 is assembled once the manifold 502 formed through a suitable method, such as casting, milling, etc., the bellows 512 are coupled to the respective openings or bores within the manifold 502. It should be noted that while the manifold 502 is illustrated herein as comprising a single integrally formed part, the manifold 502 may comprise a number of parts separately formed and coupled together through suitable techniques, such as welding, mechanical fasteners, etc. The hydraulic fluid may be introduced into the fluid chambers 510*a*-510*d*, once the fluid chambers 510*a*-510*d* are defined. The arms 574, 598 are coupled to or formed with the housing 508. The stick 554, with the flange 566 coupled to the stick 554, and the first control arm 562 and the second control arm 564 coupled to the respective ones of the first bellows 512*a*, the second bellows 512*b*, third bellows 512*c* and the fourth bellows 512*d*, is coupled to the pivot coupling 556 such that the stick 554 is movable or pivotable within the slot 50 relative to the housing 508 to expand or compress the respective ones of the first bellows 512*a*, the second bellows 512*b*, third bellows 512*c* and the fourth bellows 512*d*. The output linkage 580,with the flange 590 coupled to the output linkage 580, and the third control arm 588 coupled to the fifth bellows 512*e* and the sixth bellows 512*f*, is coupled to the second pivot coupling 582 such that the output linkage 580 is movable to provide input to the flight surfaces 14.

As the use of the automatic flight servo system 500 is substantially similar to the use of the automatic flight servo system 10, the operation of the automatic flight servo system 500 will not be discussed in great detail herein as one of ordinary skill in the art would understand the operation of the automatic flight servo system 500 based on the description regarding the operation of the automatic flight servo system 10. Briefly, however, the pivoting of the stick 554 compresses or expands the first bellows 512*a*, the second bellows 512*b*, third bellows 512*c* and the fourth bellows 512*d*. The expansion and compression of one or more of the first bellows 512*a*, the second bellows 512*b*, third bellows 512*c* and the fourth bellows 512*d* causes a resultant expansion or compression of the fifth bellows 512*e* and the sixth bellows 512*f*. The expansion or compression of the fifth bellows 512*e* and the sixth bellows 512*f*, in turn, results in a movement or pivoting of the output linkage 580 about the second pivot coupling 582. The first stability augmentation actuator 162 and/or the second stability augmentation actuator 168 may also move a respective one of the first stability output shaft 164 and the second stability output shaft 170 to displace fluid within the third fluid chamber 510*c* and the fourth fluid chamber 510*d* and thereby adjust the movement of the output linkage 580.

Thus, the automatic flight servo system 10, 300, 400, 500 of the present disclosure provides a single manifold 20, 302, 402, 502 that integrates the trim input system 22, the pilot input system 24, 504, the stability augmentation system 26 and the flight output system 28, 506 to enable the pilot of the aircraft 12 to control the flight surfaces 14 without a complex and heavy assembly of mechanical linkages. By integrating the trim input system 22, the pilot input system 24, 504, the stability augmentation system 26 and the flight output system 28, 506 into a single manifold 20, 302, 402, 502, the automatic flight servo system 10, 300, 400, 500 is compact and light weight, which allows the automatic flight servo system 10, 300, 400, 500 to be used with smaller aircraft 12, such as rotorcraft (e.g. helicopters). Moreover, the automatic flight servo system 10, 300, 400, 500 provides that the pilot input system 24, 504 directly results in movement of the flight output system 28, 506, while also allowing the stability augmentation system 26 to continually make adjustments to the movement of the flight output system 28, 506 to stabilize the aircraft 12 independently of the pilot input system 24, 504. Moreover, the use of the manifold 20, 302, 402, 502 enables output forces received by the flight output system 28, 506 and backdriven through the flight output system 28, 506 to be transferred directly to the pilot input system 24, 504, thereby reducing the likelihood of damage to the stability augmentation system 26. In this regard, the smaller size of the sixth bellows 34*f*, the seventh bellows 34*g*, the tenth bellows 34*j* and the eleventh bellows 34*k* enables the backdriven forces to be transmitted directly to the pilot input system 24, and the second valve 356 and the third valve 358 enable the fluid isolation of the stability augmentation system 26.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hydrostatic automatic flight servo system comprising:

a manifold that defines a first fluid chamber and a second fluid chamber that is fluidly isolated from the first fluid chamber, with a hydraulic fluid received in the first fluid chamber and the second fluid chamber, the first fluid chamber including a first bellows and a second bellows, and the second fluid chamber includes a third bellows and a fourth bellows;

a stick received at least partially within the manifold and pivotally coupled to the manifold, the stick including a control arm fixedly coupled to the first bellows, the stick adapted to receive an input; and a flight output system pivotally coupled to the manifold, the flight output system including:

a second control arm received at least partially within the manifold and coupled to the second bellows such that the pivotal movement of the stick pivots the flight output system relative to the manifold; and an output linkage coupled to the second control arm, the output linkage pivotally coupled to the manifold, the output linkage having a first linkage end adapted to be coupled to a flight surface, wherein the first fluid chamber further comprises a fifth bellows and a sixth bellows, and the fifth bellows and the sixth bellows are each movable along an axis that is substantially traverse to a longitudinal axis of the manifold.

2. The hydrostatic automatic flight servo system of claim 1, wherein the stick includes a third control arm and the output linkage includes a fourth control arm, and the third control arm is coupled to the third bellows and the fourth control arm is coupled to the fourth bellows.

3. The hydrostatic automatic flight servo system of claim 1, further comprising a first stability augmentation actuator having a first stability output shaft coupled to the fifth bellows and a second stability augmentation actuator having a second stability output shaft coupled to the sixth bellows, the first stability augmentation actuator moves the first stability output shaft to move the fifth bellows relative to the first fluid chamber to pivot the output linkage relative to the manifold, and the second stability augmentation actuator moves the second stability output shaft to move the sixth bellows relative to the first fluid chamber to pivot the output linkage relative to the manifold.

4. The hydrostatic automatic flight servo system of claim 3, wherein the second fluid chamber further comprises a seventh bellows and an eighth bellows, and the seventh bellows and the eighth bellows are each movable along an axis that is substantially traverse to the longitudinal axis of the manifold.

5. The hydrostatic automatic flight servo system of claim 4, wherein the first stability output shaft is coupled to the seventh bellows and the second stability output shaft is coupled to the eighth bellows such that the movement of the first stability output shaft moves the seventh bellows relative to the second fluid chamber to pivot the output linkage relative to the manifold and the movement of the second stability output shaft moves the eighth bellows relative to the second fluid chamber to pivot the output linkage relative to the manifold.

6. The hydrostatic automatic flight servo system of claim 1, wherein the manifold defines a third fluid chamber that contains the hydraulic fluid, the third fluid chamber fluidly isolated from the first fluid chamber and the third fluid chamber includes a ninth bellows and a tenth bellows.

7. The hydrostatic automatic flight servo system of claim 6, wherein the first control arm of the stick is fixedly coupled to the ninth bellows.

8. The hydrostatic automatic flight servo system of claim 7, further comprising an actuator having an output shaft, the output shaft fixedly coupled to the tenth bellows such that movement of the output shaft pivots the stick.

9. The hydrostatic automatic flight servo system of claim 8, wherein the manifold defines a fourth fluid chamber that contains the hydraulic fluid, the fourth fluid chamber fluidly isolated from the first fluid chamber and the third fluid chamber, the fourth fluid chamber including an eleventh bellows and a twelfth bellows, with the output shaft of the actuator fixedly coupled to the eleventh bellows.

10. The hydrostatic automatic flight servo system of claim 9, wherein the stick includes a third control arm, and the third control arm is fixedly coupled to the twelfth bellows.

11. The hydrostatic automatic flight servo system of claim 8, wherein the output shaft includes a first end and a second end, the first end fixedly coupled to the tenth bellows and including a stop, and the hydrostatic automatic flight servo system further comprises a spring housing coupled about the stop, with a spring disposed within the spring housing.

12. A hydrostatic automatic flight servo system comprising:

a manifold that defines a first fluid chamber, with a hydraulic fluid received in the first fluid chamber, the first fluid chamber including a first bellows and a second bellows;

a stick received at least partially within the manifold and pivotally coupled to the manifold, the stick including a control arm fixedly coupled to the first bellows, the stick adapted to receive an input; and a flight output system pivotally coupled to the manifold, the flight output system including a second control arm received at least partially within the manifold and coupled to the second bellows such that the pivotal movement of the stick pivots the flight output system relative to the manifold, wherein the first fluid chamber further defines a first fluid subchamber and a second fluid subchamber, the first fluid subchamber fluidly coupled to the first fluid chamber via a first valve and the second fluid subchamber fluidly coupled to the first fluid chamber via a second valve.

13. A hydrostatic automatic flight servo system comprising:

a manifold that defines a first fluid chamber, a second fluid chamber and a third fluid chamber, with a hydraulic fluid received in each of the first fluid chamber, the second fluid chamber and the third fluid chamber, the first fluid chamber fluidly isolated from the second fluid chamber and the third fluid chamber fluidly isolated from the first fluid chamber and the second fluid chamber, the first fluid chamber including a first bellows and a second bellows, the second fluid chamber including a third bellows and a fourth bellows, and the third fluid chamber including a fifth bellows and a sixth bellows;

a stick received at least partially within the manifold and pivotally coupled to the manifold, the stick including a first control arm fixedly coupled to the first bellows and the fifth bellows, and a second control arm fixedly coupled to the third bellows, the first control arm spaced apart from the second control arm;

an output linkage pivotally coupled to the manifold, the output linkage including a third control arm spaced apart from a fourth control arm, each of the third control arm and the fourth control arm received at least partially within the manifold, the third control arm fixedly coupled to the second bellows and the fourth control arm fixedly coupled to the fourth bellows such that the pivotal movement of the stick pivots the output linkage relative to the manifold; and an actuator having an output shaft, the output shaft fixedly coupled to the sixth bellows such that movement of the output shaft pivots the stick.

14. The hydrostatic automatic flight servo system of claim 13, wherein the manifold defines a fourth fluid chamber that contains the hydraulic fluid, the fourth fluid chamber fluidly isolated from the first fluid chamber, the second fluid chamber and the third fluid chamber, the fourth fluid chamber including a seventh bellows and an eighth bellows, with the output shaft of the actuator fixedly coupled to the seventh bellows and the second control arm of the stick is fixedly coupled to the eighth bellows.

* * * * *